United States Patent
Tong

(10) Patent No.: US 9,804,981 B2
(45) Date of Patent: Oct. 31, 2017

(54) METHOD, CONTROLLER, AND SYSTEM FOR SERVICE FLOW CONTROL IN OBJECT-BASED STORAGE SYSTEM

(71) Applicant: HUAWEI TECHNOLOGIES CO., LTD., Shenzhen, Guangdong (CN)

(72) Inventor: Yanqun Tong, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/490,118

(22) Filed: Apr. 18, 2017

(65) Prior Publication Data

US 2017/0220500 A1   Aug. 3, 2017

Related U.S. Application Data

(63) Continuation of application No. PCT/CN2014/089180, filed on Oct. 22, 2014.

(51) Int. Cl.
    G06F 13/12   (2006.01)
    G06F 13/38   (2006.01)
    G06F 13/36   (2006.01)

(52) U.S. Cl.
    CPC .................. *G06F 13/36* (2013.01)

(58) Field of Classification Search
    None
    See application file for complete search history.

(56) References Cited

U.S. PATENT DOCUMENTS 7,065,767 B2   6/2006   Kambhammettu et al.
7,814,451 B2   10/2010  Furnish et al.
(Continued)

FOREIGN PATENT DOCUMENTS

CN   101013387 A   8/2007
CN   100466625 C   3/2009
(Continued)

OTHER PUBLICATIONS

Nottinggham M, Fielding R: "RFC 6585: Additional HTTP status codes", Internet Engineering Task Force (IETF), Apr. 2012, XP15081518, total 10 pages.
(Continued)

*Primary Examiner* — Michael Sun
(74) *Attorney, Agent, or Firm* — Huawei Technologies Co., Ltd.

(57) ABSTRACT

A method, a controller, and a system for service flow control in an object-based storage system are disclosed. The method is: receiving, by a controller, a first object IO request; acquiring a processing quantity threshold and a to-be-processed quantity; if the to-be-processed quantity is less than the processing quantity threshold, sending the first object IO request to a storage device client, and updating the to-be-processed quantity; receiving a first response message replied by the storage device client for the first object IO request, where the first response message carries a processing result of the first object IO request; and adjusting the processing quantity threshold according to a received processing result of an object IO request when a preset condition is met. The storage device is not overloaded with object IO requests and can use all resources to effectively, thereby improving performance and a success rate of the object-based storage system.

30 Claims, 11 Drawing Sheets

(56) References Cited

U.S. PATENT DOCUMENTS

| | | | |
|---|---|---|---|
| 8,984,216 B2* | 3/2015 | Fillingim | G06F 11/3485 711/103 |
| 9,104,599 B2* | 8/2015 | Atkisson | G06F 11/108 |
| 9,626,695 B2* | 4/2017 | Balasubramanian | G06Q 30/0255 |
| 2006/0288351 A1* | 12/2006 | Detlefs | G06F 9/528 718/107 |
| 2008/0244196 A1* | 10/2008 | Shitomi | G06F 3/0605 711/147 |
| 2011/0153724 A1 | 6/2011 | Raja et al. | |
| 2012/0166483 A1* | 6/2012 | Choudhary | G06F 17/30545 707/770 |
| 2012/0239376 A1 | 9/2012 | Kraft et al. | |
| 2013/0205114 A1* | 8/2013 | Badam | G06F 3/0613 711/207 |
| 2014/0047000 A1 | 2/2014 | Zelek et al. | |
| 2014/0153422 A1 | 6/2014 | Nambiar et al. | |
| 2015/0341466 A1* | 11/2015 | Sah | G06F 17/30545 707/770 |
| 2016/0062837 A1* | 3/2016 | Slik | G06F 11/1076 714/6.24 |

FOREIGN PATENT DOCUMENTS

| | | |
|---|---|---|
| CN | 101776946 A | 7/2010 |
| CN | 101957729 A | 1/2011 |
| CN | 103036956 | 4/2013 |
| CN | 103150225 A | 6/2013 |

OTHER PUBLICATIONS

Ravi Lyer et al:"Overload control mechanisms for web servers", Server Architecture Lab, Intel Corporation, Beaverton, OR, Nov. 2000, XP2556775, total 20 pages.
Anonymous:"ZigBee Over-the Air Upgrading Cluster", ZigBee Alliance, Mar. 12, 2014,total 64 pages.

* cited by examiner

METHOD, CONTROLLER, AND SYSTEM FOR SERVICE FLOW CONTROL IN OBJECT-BASED STORAGE SYSTEM

CROSS-REFERENCE TO RELATED APPLICATIONS

This application is a continuation in of International Application No. PCT/CN2014/089180, filed on Oct. 22, 2014, which is hereby incorporated by reference in its entireties.

TECHNICAL FIELD

The present invention relates to the storage field, and in particular, to a method, a controller, and a system for service flow control in an object-based storage system.

BACKGROUND

With rapid development of the Internet and Web 2.0, web (Web) applications have created tens of billions of small files. Moreover, people are uploading more pictures, videos, and music, and are sending hundreds of billions of emails, which generates more data. According to statistics of the Internet Data Center (IDC), a data volume is expected to grow by 44 times in the next 10 years, and global data will grow to 35 ZB (Zettabyte) by 2020, where 80% is unstructured data, and a large portion is inactive data. There is a problem about how to store such mass data.

For such a huge data volume, a block storage technology and a file storage technology that only have scalability in PB (Petabyte) seem powerless. An object-based storage system (Object-Based Storage System), with advantages such as direct access of the block storage technology and data sharing of the file storage technology, provides a highly-reliable, cross-platform, and secure data-sharing storage system.

As shown in FIG. 1, an object-based storage system generally includes a controller 101, a storage device client 103, and a storage device cluster 104. The controller 101 may be further connected to an external client, and the external client may be connected to another device (for example, a domain name server) (the external client and the domain name server are not shown in FIG. 1). The storage device client 103 is connected to multiple storage devices in the storage device cluster 104, and a storage device may be an IP (internet protocol) hard disk or another smart disk, for example, a solid state drive (Solid State Drive, SSD).

In an object-based storage system, a two-layer service model based on a container (bucket) and an object (object) is used most widely. The container may be understood as a special top-level directory or a globally unique domain name. The object is a basic unit for object storage. Each object is a combination of data and a data attribute set. A data attribute may be set as required of an application, and includes data distribution, quality of service, and the like. The object maintains its own attribute, which simplifies a management task of a storage system and improves flexibility. The object may have a different size, and may include an entire data structure, for example, a file, a database entry, a directory, and the like.

If a container operation (which may also be referred to as a bucket operation) is to be performed, a user sends a container IO (input/output) request to a controller by using a client; when an object operation is to be performed, the client sends an object IO request to the controller. Compared with the object IO request, the container IO request is generally smaller, and generally does not exceed 1 megabyte (M). The object IO request is generally larger, and a large one may be several M or may be less than 1 M. In embodiments of the present invention, processing may be performed only according to a size of an IO request regardless of whether the IO request is a container IO request or an object IO request. Therefore, in the following descriptions, an IO request is not specifically referred to as a container IO request or an object IO request, but is simply referred to as an object IO request.

An object IO request may be a write object IO request or a read object IO request. In the embodiments, unless otherwise specified, a described procedure is applicable to both a write object IO request and a read object IO request.

When the user needs to read and write data, the external client is used to send an object IO request to the controller 101; then, the controller 101 sends the object IO request to the storage device client 103; the storage device client 103 sends the object IO request to a corresponding storage device by using an algorithm; and the storage device processes the object IO request. Each storage device can process and temporarily store a limited quantity of object IO requests. During peak service hours, the following case is likely to occur: object IO requests are delivered at a speed exceeding a processing capability and a cache capability of each storage device. For an object IO request that cannot be processed, the storage device further needs to feed back an overload response. A resource of the storage device that is occupied for feeding back the overload response is not less than a resource required to process one object IO request. This may result in that more object IO requests cannot be processed.

In addition, a large object IO request is generally split into multiple small object IO requests; the large object IO request fails to be processed provided that one small object IO request fails to be processed. A small object IO request usually needs to wait for a long time, and a probability of a processing failure increases after waiting for a long time.

An object IO request that fails to be processed and an object IO request that cannot be processed in a timely manner will be resent to the storage device in repeated attempts for processing, which forms a vicious cycle and reduces performance and a success rate of the entire object-based storage system for processing an object IO request.

SUMMARY

Embodiments of the present invention provide a method, a controller, and a system for service flow control in an object-based storage system, to resolve a problem in the prior art that performance and a success rate of the object-based storage system for processing an object IO request is low at peak service hours.

A first aspect of the embodiments of the present invention provides a service flow control method in an object-based storage system, where the object-based storage system includes a controller and a storage device client, and the method includes: receiving, by the controller, a first object IO request; acquiring a processing quantity threshold and a to-be-processed quantity, where the processing quantity threshold is a threshold of a quantity of object IO requests that can be processed by the object-based storage system, and the to-be-processed quantity is a quantity of to-be-processed object IO requests in the object-based storage system; if the to-be-processed quantity is less than the processing quantity threshold, sending the first object IO request to the storage device client, and updating the to-be-processed quantity; receiving a first response message replied by the storage device client for the first object IO request, where the first response message carries a processing result of the first object IO request; and adjusting the processing quantity threshold according to a received processing result of an object IO request when a preset condition is met.

With reference to the first aspect, in a first possible implementation manner of the first aspect, the method further includes: when the controller receives a second object IO request, acquiring a current value of the processing quantity threshold and a current value of the to-be-processed quantity; and if the current value of the to-be-processed quantity is greater than or equal to the current value of the processing quantity threshold, replying with a reject response message or a busy response message.

With reference to the first aspect or the first possible implementation manner of the first aspect, in a second possible implementation manner of the first aspect, the method further includes: starting a hibernation time after the sending the first object IO request to the storage device client; when the controller receives a third object IO request, acquiring a current value of the processing quantity threshold and a current value of the to-be-processed quantity; and if the current value of the to-be-processed quantity is less than the current value of the processing quantity threshold, sending the third object IO request to the storage device client after the hibernation time ends, and updating the to-be-processed quantity.

With reference to the first aspect, the first possible implementation manner of the first aspect, or the second possible implementation manner of the first aspect, in a third possible implementation manner of the first aspect, after the receiving a first response message replied by the storage device client for the first object IO request, the method further includes: updating a sent quantity, where the sent quantity is a quantity of object IO requests that are sent by the controller to the storage device client; and if the processing result carried in the first response message indicates a processing success, updating a successfully processed quantity, where the successfully processed quantity is a quantity of received object IO requests that are successfully processed by the storage device client; or if the processing result carried in the first response message indicates a processing failure, retaining a successfully processed quantity unchanged.

With reference to the first aspect or the first possible implementation manner of the first aspect, in a fourth possible implementation manner of the first aspect, the sending the first object IO request to the storage device client includes: acquiring a split size threshold, where the split size threshold is a size threshold of an object IO request that can be processed by the object-based storage system; and when a size of the first object IO request is greater than the split size threshold, splitting, by the controller, the first object IO request into multiple sub-object IO requests, where a size of each sub-object IO request is not greater than the split size threshold and carries a same identifier; and the sending the first object IO request to the storage device client is specifically: sending, by the controller, a first sub-object IO request to the storage device client; starting a hibernation time, and sending a second sub-object IO request to the storage device client after the hibernation time ends; and returning to execute a step of starting the hibernation time, until the multiple sub-object IO requests are sent to the storage device client.

With reference to the fourth possible implementation manner of the first aspect, in a fifth possible implementation manner of the first aspect, after the sending, by the controller, a first sub-object IO request to the storage device client, the method further includes: receiving a response message replied by the storage device client for the first sub-object IO request, where the response message carries a processing result of the first sub-object IO request; updating a sent quantity, where the sent quantity is a quantity of object IO requests that are sent by the controller to the storage device client; if the processing result indicates a processing success, updating a successfully processed quantity, where the successfully processed quantity is a quantity of received object IO requests that are successfully processed by the storage device client; or if the processing result indicates a final processing failure, retaining a successfully processed quantity unchanged; and returning to execute a step of receiving a response message replied by the storage device client, until processing results of the multiple sub-object IO requests are received.

With reference to the third possible implementation manner of the first aspect or the fifth possible implementation manner of the first aspect, in a sixth possible implementation manner of the first aspect, the adjusting the processing quantity threshold according to a received processing result of an object IO request includes: periodically acquiring, by the controller, a current value of the sent quantity and a current value of the successfully processed quantity according to a preset time period; calculating a processing success rate of an object IO request according to the current value of the sent quantity and the current value of the successfully processed quantity; and adjusting the processing quantity threshold by using the processing success rate as a first adjustment coefficient.

With reference to the sixth possible implementation manner of the first aspect, in a seventh possible implementation manner of the first aspect, the method further includes: adjusting, according to a second adjustment coefficient, a processing quantity threshold that is obtained after adjustment is performed according to the first adjustment coefficient, where a value of the second adjustment coefficient is proportional to that of the first adjustment coefficient.

With reference to the sixth possible implementation manner of the first aspect or the seventh possible implementation manner of the first aspect, in an eighth possible implementation manner of the first aspect, an upper limit and a lower limit of the processing quantity threshold are set on the controller, and the method further includes: modifying, according to the upper limit or the lower limit of the processing quantity threshold, a processing quantity threshold that is obtained after adjustment, so that a value of the processing quantity threshold that is obtained after adjustment is between the upper limit and the lower limit of the processing quantity threshold.

With reference to the third possible implementation manner of the first aspect or the fifth possible implementation manner of the first aspect, in a ninth possible implementation manner of the first aspect, the method further includes:

periodically acquiring, by the controller, a current value of the sent quantity and a current value of the successfully processed quantity according to a preset time period; calculating a processing success rate of an object IO request according to the current value of the sent quantity and the current value of the successfully processed quantity; and adjusting the hibernation time by using the processing success rate as a first adjustment coefficient.

With reference to the ninth possible implementation manner of the first aspect, in a tenth possible implementation manner of the first aspect, the method further includes: adjusting the hibernation time according to a third adjustment coefficient and the first adjustment coefficient, where a value of the third adjustment coefficient is inversely proportional to that of the first adjustment coefficient.

With reference to the ninth possible implementation manner of the first aspect or the tenth possible implementation manner of the first aspect, in an eleventh possible implementation manner of the first aspect, an upper limit and a lower limit of the hibernation time are set on the controller, and the method further includes: modifying, according to the upper limit or the lower limit of the hibernation time, a hibernation time that is obtained after adjustment, so that a value of the hibernation time that is obtained after adjustment is between the upper limit and the lower limit of the hibernation time.

With reference to the first aspect or any possible implementation manner of the first aspect, in a twelfth possible implementation manner of the first aspect, the method further includes:

Replying with, by the controller, a response message to a requesting party that sends an object IO request, where the response message carries a final processing result of the object IO request; and updating the to-be-processed quantity.

A second aspect of the embodiments of the present invention provides a service flow control method in an object-based storage system, where the object-based storage system includes a controller and a storage device client, and the method includes: receiving, by the controller, a first object IO request; acquiring a split size threshold, where the split size threshold is a size of an object IO request that can be processed by the object-based storage system; when a size of the first object IO request is greater than the split size threshold, splitting, by the controller, the first object IO request into multiple sub-object IO requests, where a size of each sub-object IO request is not greater than the split size threshold and carries a same identifier; sending a first sub-object IO request to the storage device client, and starting a hibernation time; receiving a response message replied by the storage device client for the first sub-object IO request, where the response message carries a processing result of the first sub-object IO request; and adjusting the hibernation time according to a received processing result of an object IO request when a preset condition is met.

With reference to the second aspect, in a first possible implementation manner of the second aspect, after the starting a hibernation time, the method further includes: after the hibernation time ends, sending a second sub-object IO request to the storage device client; and returning to execute a step of starting the hibernation time, until the multiple sub-object IO requests are sent to the storage device client.

With reference to the second aspect or the first possible implementation manner of the second aspect, in a second possible implementation manner of the second aspect, after the receiving a response message for the first sub-object IO request, the method further includes: updating a sent quantity, where the sent quantity is a quantity of object IO requests that are sent by the controller to the storage device client; if the processing result of the first object IO request that is carried in the first response message indicates a processing success, updating a successfully processed quantity, where the successfully processed quantity is a quantity of received object IO requests that are successfully processed by the storage device client; or if the processing result of the first object IO request that is carried in the first response message indicates a final processing failure, retaining a successfully processed quantity unchanged; and returning to execute a step of receiving a response message replied by the storage device client, until processing results of the multiple sub-object IO requests are received.

With reference to the second aspect, the first possible implementation manner of the second aspect, or the second possible implementation manner of the second aspect, in a third possible implementation manner of the second aspect, the adjusting the hibernation time according to a received processing result of an object IO request when a preset condition is met is specifically: periodically acquiring, by the controller, a current value of the sent quantity and a current value of the successfully processed quantity according to a preset time period; calculating a processing success rate of an object IO request according to the current value of the sent quantity and the current value of the successfully processed quantity; and adjusting the hibernation time by using the processing success rate as a first adjustment coefficient.

With reference to the third possible implementation manner of the second aspect, in a fourth possible implementation manner of the second aspect, the method further includes:

adjusting, according to a third adjustment coefficient, a hibernation time that is obtained after adjustment is performed according to the first adjustment coefficient, where a value of the third adjustment coefficient is inversely proportional to that of the first adjustment coefficient.

With reference to the third possible implementation manner of the second aspect or the fourth possible implementation manner of the second aspect, in a fifth possible implementation manner of the second aspect, an upper limit and a lower limit of the hibernation time are set on the controller, and the method further includes: modifying, according to the upper limit or the lower limit of the hibernation time, a hibernation time that is obtained after adjustment, so that a value of the hibernation time that is obtained after adjustment is between the upper limit and the lower limit of the hibernation time.

A third aspect of the embodiments of the present invention provides a controller for implementing service flow control in an object-based storage system, where the controller includes a storing module 701, a processing module 702, a receiving module 703, and a sending module 704, where: the receiving module 703 is configured to receive a first object IO request, and send the first object IO request to the processing module 702; after receiving the first object IO request, the processing module 702 acquires a processing quantity threshold and a to-be-processed quantity from the storing module 701, where the processing quantity threshold is a threshold of a quantity of object IO requests that can be processed by the object-based storage system, and the to-be-processed quantity is a quantity of to-be-processed object IO requests in the object-based storage system; if the to-be-processed quantity is less than the processing quantity threshold, the processing module 702 is further configured to send the first object IO request to the sending module 704, and update the to-be-processed quantity in the storing module 701; the sending module 704 is further configured to send the first object IO request to a storage device client; receive a first response message replied by the storage device client for the first object IO request, where the first response message carries a processing result of the first object IO request; and send the first response message to the processing module 702; and the processing module 702 is further configured to adjust the processing quantity threshold in the storing module 701 according to a received processing result of an object IO request when a preset condition is met.

With reference to the third aspect, in a first possible implementation manner of the third aspect, if the to-be-processed quantity is greater than or equal to the processing quantity threshold, the processing module 702 is further configured to reply with a reject response message or a busy response message to a requesting party of the first object IO request.

With reference to the third aspect or the first possible implementation manner of the third aspect, in a second possible implementation manner of the third aspect, the processing module 702 is further configured to start a hibernation time after sending the first object IO request to the sending module 704, and send a second object IO request to the sending module 704 after the hibernation time ends.

With reference to the third aspect, the first possible implementation manner of the third aspect, or the second possible implementation manner of the third aspect, in a third possible implementation manner of the third aspect, the processing module 702 is further configured to: after receiving the first response message, update a sent quantity in the storing module 701, where the sent quantity is a quantity of object IO requests that are sent by the controller to the storage device client; and if the processing result carried in the first response message indicates a processing success, update a successfully processed quantity in the storing module 701, where the successfully processed quantity is a quantity of received object IO requests that are successfully processed by the storage device client.

With reference to the third aspect or the first possible implementation manner of the third aspect, in a fourth possible implementation manner of the third aspect, the processing module 702 is further configured to: when the first object IO request is greater than a split size threshold, split the first object IO request into multiple sub-object IO requests, where a size of each sub-object IO request is not greater than the split size threshold and carries a same identifier, and the split size threshold is a size threshold of an object IO request that can be processed by the object-based storage system; send a first sub-object IO request obtained by splitting to the storage device client by using the sending module 704; and start a hibernation time, and send a second sub-object IO request by using the sending module 704 after the hibernation time ends.

With reference to the fourth possible implementation manner of the third aspect, in a fifth possible implementation manner of the third aspect, the sending module 704 receives a response message replied by the storage device client for the first sub-object IO request, where the response message carries a processing result of the first sub-object IO request; and send the response message to the processing module 702; the processing module 702 is further configured to receive the processing result of the first sub-object IO request, and update a sent quantity, where the sent quantity is a quantity of object IO requests that are sent to the storage device client; and if the processing result indicates a processing success, the processing module 702 is further configured to update a successfully processed quantity, where the successfully processed quantity is a quantity of received object IO requests that are successfully processed by the storage device client.

With reference to the third possible implementation manner of the third aspect or the fifth possible implementation manner of the third aspect, in a sixth possible implementation manner of the third aspect, that the processing module 702 is further configured to adjust the processing quantity threshold in the storing module 701 according to a received processing result of an object IO request when the preset condition is met is specifically that: the processing module 702 periodically acquires a current value of the sent quantity and a current value of the successfully processed quantity according to a preset time period; calculates a processing success rate of an object IO request according to the current value of the sent quantity and the current value of the successfully processed quantity; and adjusts the processing quantity threshold by using the processing success rate as a first adjustment coefficient.

With reference to the sixth possible implementation manner of the third aspect, in a seventh possible implementation manner of the third aspect, the processing module 702 is further configured to adjust, according to a second adjustment coefficient, a processing quantity threshold that is obtained after adjustment is performed according to the first adjustment coefficient, where a value of the second adjustment coefficient is proportional to that of the first adjustment coefficient.

With reference to the sixth possible implementation manner of the third aspect or the seventh possible implementation manner of the third aspect, in an eighth possible implementation manner of the third aspect, the storing module 701 further stores an upper limit and a lower limit of the processing quantity threshold; and the processing module 702 is further configured to modify, according to the upper limit or the lower limit of the processing quantity threshold, a processing quantity threshold that is obtained after adjustment, so that a value of the processing quantity threshold that is obtained after adjustment is between the upper limit and the lower limit of the processing quantity threshold.

With reference to the third possible implementation manner of the third aspect or the fifth possible implementation manner of the third aspect, in a ninth possible implementation manner of the third aspect, the processing module 702 is further configured to: periodically acquire a current value of the sent quantity and a current value of the successfully processed quantity according to a preset time period; calculate a processing success rate of an object IO request according to the current value of the sent quantity and the current value of the successfully processed quantity; and adjust the hibernation time by using the processing success rate as a first adjustment coefficient.

With reference to the ninth possible implementation manner of the third aspect, in a tenth possible implementation manner of the third aspect, the processing module 702 is further configured to adjust the hibernation time according to a third adjustment coefficient and the first adjustment coefficient, where a value of the third adjustment coefficient is inversely proportional to that of the first adjustment coefficient.

With reference to the ninth possible implementation manner of the third aspect or the tenth possible implementation manner of the third aspect, in an eleventh possible implementation manner of the third aspect, the storing module 701 further stores an upper limit and a lower limit of the hibernation time; and the processing module 702 is further configured to modify, according to the upper limit or the lower limit of the hibernation time, a hibernation time that is obtained after adjustment, so that a value of the hibernation time that is obtained after adjustment is between the upper limit and the lower limit of the hibernation time.

With reference to the third aspect or any possible implementation manner of the third aspect, in a twelfth possible implementation manner of the third aspect, the processing module 702 is further configured to reply with, by using the receiving module 703, a response message to a requesting party that sends an object IO request, where the response message carries a final processing result of the object IO request; and update the to-be-processed quantity.

A fourth aspect of the embodiments of the present invention provides a controller for implementing service flow control in an object-based storage system, where the controller includes a storing module 701, a processing module 702, a receiving module 703, and a sending module 704, where: the receiving module 703 is configured to receive a first object IO request, and send the first object IO request to the processing module 702; the processing module 702 is configured to: after receiving the first object IO request, acquire a split size threshold from the storing module 701, where the split size threshold is a size of an object IO request that can be processed by the object-based storage system; the processing module 702 is further configured to: when a size of the first object IO request is greater than the split size threshold, split the first object IO request into multiple sub-object IO requests, where a size of each sub-object IO request is not greater than the split size threshold and carries a same identifier; and send a first sub-object IO request to the sending module 704, and start a hibernation time; the sending module 704 is configured to send the first sub-object IO request to a storage device client connected to the controller; receive a response message replied by the storage device client for the first sub-object IO request, where the response message carries a processing result of the first sub-object IO request; and send the response message for the first sub-object IO request to the processing module 702; and the processing module 702 is further configured to adjust the hibernation time according to a received processing result of an object IO request when a preset condition is met.

With reference to the fourth aspect, in a first possible implementation manner of the fourth aspect, the processing module 702 is further configured to: after the hibernation time is started, send a second sub-object IO request to the storage device client by using the sending module after the hibernation time ends; and return to execute a step of starting the hibernation time, until the multiple sub-object IO requests are sent to the storage device client.

With reference to the fourth aspect or the first possible implementation manner of the fourth aspect, in a second possible implementation manner of the fourth aspect, the processing module 702 is further configured to: after receiving the response message for the first sub-object IO request, update a sent quantity, where the sent quantity is a quantity of object IO requests that are sent by the processing module 702 to the storage device client by using the sending module 704; and if the processing result of the first object IO request that is carried in the response message for the first sub-object IO request indicates a processing success, the processing module 702 is further configured to update a successfully processed quantity, where the successfully processed quantity is a quantity of received object IO requests that are successfully processed by the storage device client; or if the processing result of the first object IO request that is carried in the response message for the first sub-object IO request indicates a final processing failure, retain a successfully processed quantity unchanged.

With reference to the fourth aspect, the first possible implementation manner of the fourth aspect, or the second possible implementation manner of the fourth aspect, in a third possible implementation manner of the fourth aspect, that the processing module 702 is further configured to adjust the hibernation time according to a received processing result of an object IO request when a preset condition is met is specifically that: the processing module 702 periodically acquires a current value of the sent quantity and a current value of the successfully processed quantity according to a preset time period; calculates a processing success rate of an object IO request according to the current value of the sent quantity and the current value of the successfully processed quantity; and adjusts the hibernation time by using the processing success rate as a first adjustment coefficient.

With reference to the third possible implementation manner of the fourth aspect, in a fourth possible implementation manner of the fourth aspect, the processing module 702 is further configured to adjust, according to a third adjustment coefficient, a hibernation time that is obtained after adjustment is performed according to the first adjustment coefficient, where a value of the third adjustment coefficient is inversely proportional to that of the first adjustment coefficient.

With reference to the third possible implementation manner of the fourth aspect or the fourth possible implementation manner of the fourth aspect, in a fifth possible implementation manner of the fourth aspect, the storing module 701 further stores an upper limit and a lower limit of the hibernation time; and the processing module 702 is further configured to modify, according to the upper limit or the lower limit of the hibernation time, a hibernation time that is obtained after adjustment, so that a value of the hibernation time that is obtained after adjustment is between the upper limit and the lower limit of the hibernation time.

A fifth aspect of the embodiments of the present invention provides a device for implementing service flow control in an object-based storage system, including the controller according to any one of the third aspect, the fourth aspect, and the possible implementation manners thereof.

A sixth aspect of the embodiments of the present invention provides a system that can implement service flow control, including the controller according to any one of the third aspect, the fourth aspect, and the possible implementation manners thereof, a storage device client, and at least two storage devices, where: the controller is connected to the storage device client, and the storage device client is connected to the at least two storage devices.

In the embodiments of the present invention, in consideration of a case in which performance and a success rate of an object-based storage system for processing an object IO request are low at peak service hours because the object-based storage system receives a large quantity of object IO requests, it is provided to add, to a processor of the object-based storage system, a threshold of a quantity of object IO requests that can be processed by the object-based storage system, that is, a processing quantity threshold, and correspondingly adjust the processing quantity threshold according to a processing result of an object IO request, to control a quantity of object IO requests received by the object-based storage system and a quantity of object IO requests sent to a storage device in the object-based storage system. This can ensure that the object IO requests received by the storage device do not exceed a processing capability and a cache capability of the storage device, so that all resources of the storage device are used to effectively process the object IO requests, thereby improving performance and a success rate of the object-based storage system for processing an object IO request.

In the embodiments of the present invention, it is further provided to add a hibernation time to the processor of the object-based storage system, and correspondingly adjust the hibernation time according to a processing result of an object IO request, to control a time interval for sending an object IO request to the storage device in the object-based storage system, and control an object IO request that needs to be processed by the storage device, so that the object IO requests received by the storage device do not exceed a processing capability and a cache capability of the storage device, and all resources of the storage device are used to effectively process the object IO requests, thereby improving performance and a success rate of the object-based storage system for processing an object IO request.

BRIEF DESCRIPTION OF DRAWINGS

FIG. 2-1 is a procedure of a service flow control method in an object-based storage system;

FIG. 2-2 is a procedure of another service flow control method in an object-based storage system;

FIG. 2-3 is a procedure of still another service flow control method in an object-based storage system;

FIG. 3 is a procedure of yet another service flow control method in an object-based storage system;

DESCRIPTION OF EMBODIMENTS

The present invention provides a method, a controller, and a system for service flow control in an object-based storage system. The controller in the object-based storage system adjusts, according to a result of processing an object IO request by a storage device, a threshold of a quantity of object IO requests that can be processed by the object-based storage system, that is, a processing quantity threshold, to implement control over a quantity of received object IO requests, so that a quantity of object IO requests that are sent to the storage device for processing does not exceed a processing capability and a cache capability of the storage device, which ensures the processing capability of the storage device, thereby improving a success rate and timeliness of processing an object IO request by the object-based storage system.

With reference to the accompanying drawings, the following expounds implementation methods, specific implementation manners, and corresponding achievable beneficial effects of the technical solutions in the embodiments of the present invention. Apparently, the described embodiments are some rather than all of the embodiments of the present invention.

Figure 1:
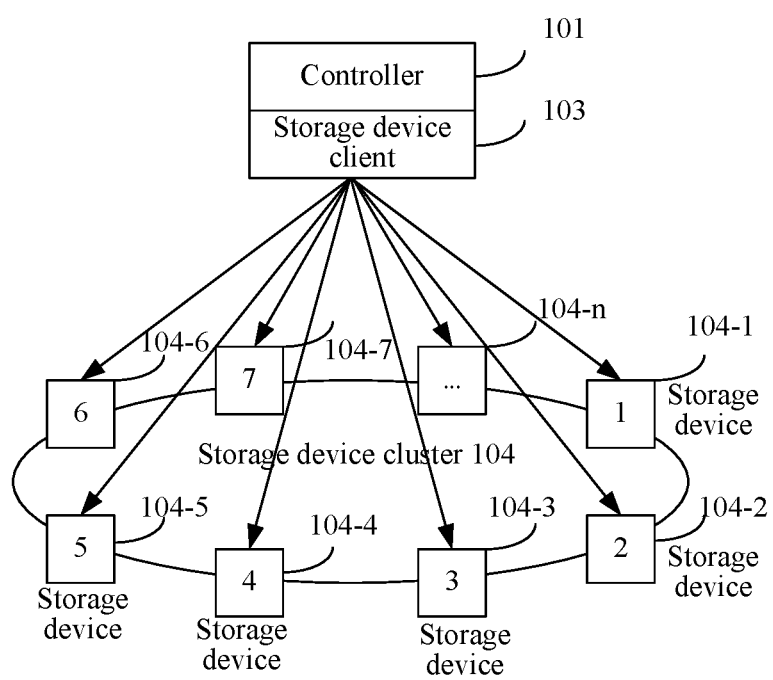
FIG. 1 is a schematic diagram of a system architecture of an object-based storage system.

FIG. 1 shows a schematic structural diagram of an object-based storage system according to an embodiment of the present invention. As shown in FIG. 1, a controller 101 is connected to a storage device client 103, and the storage device client 103 is connected to multiple storage devices in a storage device cluster 104. The controller 101 may be further connected to an external client, and the external client may be further connected to another device. The controller 101 and the storage device client 103 may be deployed on one server or may be deployed on two servers, and the server may be an HTTP (Hypertext Transfer Protocol) server, that is, a server using the HTTP protocol. The controller 101 is generally in a one-to-one relationship with the storage device client 103; that is, one controller 101 corresponds to one storage device client 103. The object-based storage system may further include multiple groups of controllers and storage device clients (not shown in FIG. 1), and the controllers are connected to storage devices in the storage device cluster by using corresponding storage device clients. The storage device cluster includes multiple storage devices, and the multiple storage devices provide a uniform namespace and scalable storage space to the groups of controllers and storage device clients by using a distribution algorithm. The storage device cluster may be shared by multiple storage device clients, for the groups of controllers and storage device clients to independently perform service control and operations.

In an actual application, each group of controller and storage device client may be connected to only some storage devices in the storage device cluster.

This embodiment of the present invention is described by using an example in which there is one group of controller and storage device client, and the controller 101 and the storage device client 103 are deployed on one HTTP server.

In this embodiment of the present invention, a storage device is an IP disk, a storage device client is an IP disk client, and the IP disk client may be connected to multiple IP disks. IP disks provide a uniform namespace and scalable mass storage space by using a distribution algorithm. An IP disk in the object-based storage system may be accessed by using a Key-Value as a basic access unit. One Key-Value operation is one IO request, and is a value that is obtained after calculation is performed according to a parameter such as an attribute of an object IO request. A Key is a unique identifier of a data block specified by a user, and the Key may be used by a storage device to locate a specific data block. A Value is data block content corresponding to the Key. Each key corresponds to one value, and the value indicates a storage location and a size of an object on the IP disk. A smart disk of another type, for example, an SSD, may also be used as a storage device. Unless otherwise specified, an implementation principle of a storage device of another type is similar to that of an IP disk.

Figures 1, 2:
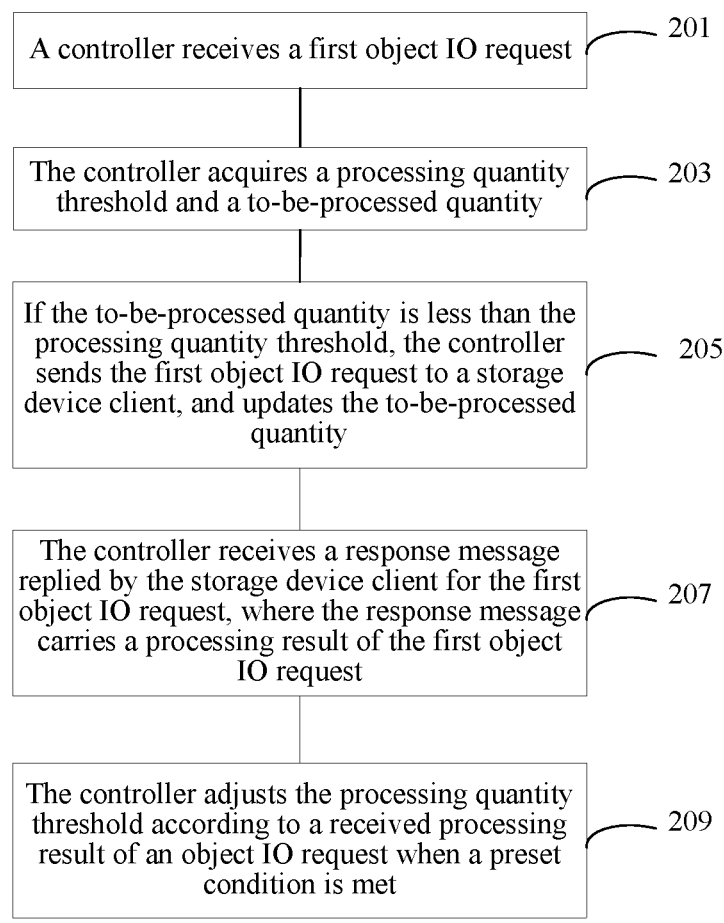
Figure 2:
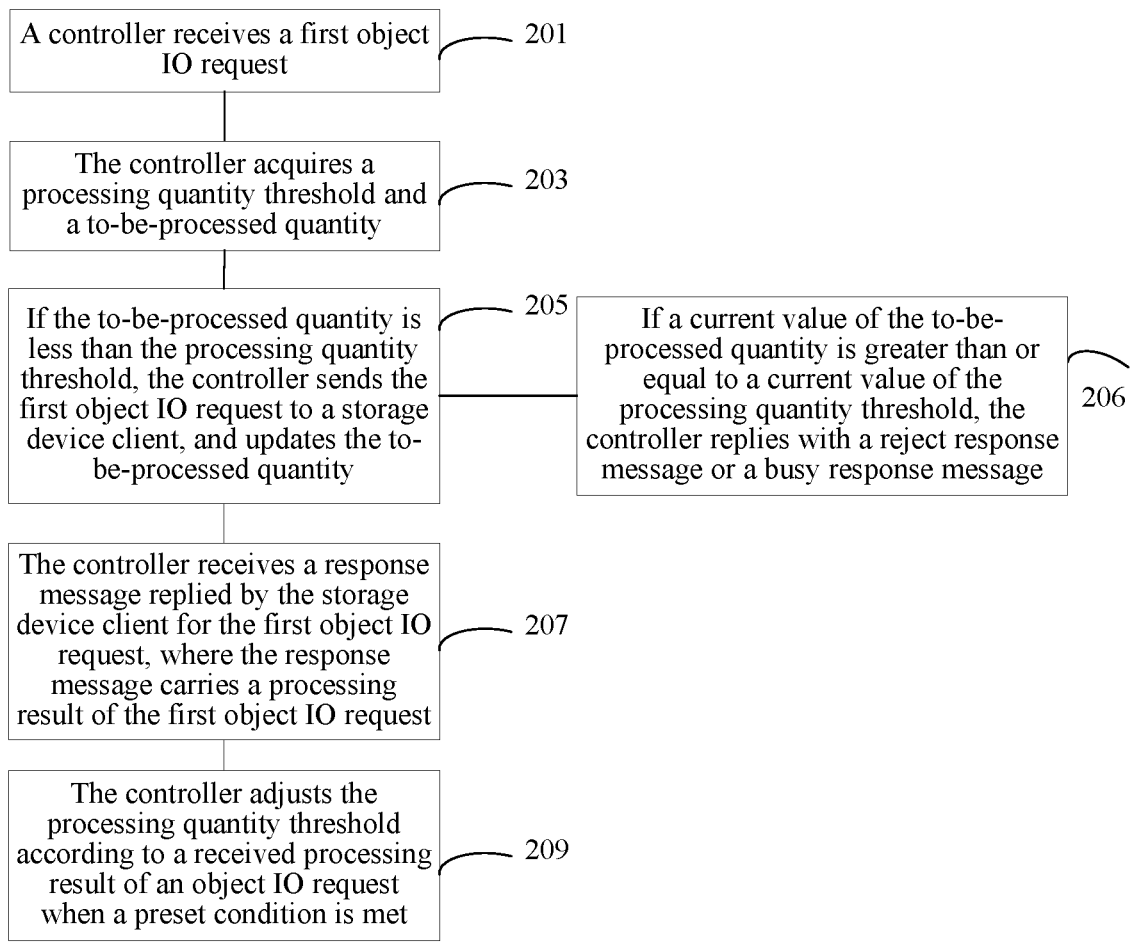

FIG. 2-1 shows a procedure of a service flow control method in an object-based storage system. The method includes:

Step 201: A controller receives a first object IO request.

A user sends the first object IO request to the controller by using a client. Before sending the first object IO request to the controller, the client may further send domain name information of the controller to a domain name server first. The domain name server returns an IP address of the controller to the client; then, the client sends the first object IO request to the corresponding controller according to the received IP address.

Step 203: The controller acquires a processing quantity threshold and a to-be-processed quantity, where the processing quantity threshold is a threshold of a quantity of object IO requests that can be processed by the object-based storage system, and the to-be-processed quantity is a quantity of to-be-processed object IO requests in the object-based storage system.

The controller stores a maximum value of the quantity of object IO requests that can be processed by the object-based storage system, that is, the processing quantity threshold. The controller further records the quantity of to-be-processed object IO requests in the object-based storage system, that is, the to-be-processed quantity. A value of the to-be-processed quantity of object IO requests in the object-based storage system varies with processing results of the object IO requests. In this embodiment of the present invention, the processing quantity threshold may be dynamically adjusted by the controller according to a processing result of an object IO request, to ensure that the processing quantity threshold is a maximum value of a quantity of object IO request that can be processed by the object-based storage system in a current condition.

Step 205: If the to-be-processed quantity is less than the processing quantity threshold, the controller sends the first object IO request to a storage device client, and updates the to-be-processed quantity.

The to-be-processed quantity and the processing quantity threshold are compared. When the to-be-processed quantity is less than the processing quantity threshold, an upper limit of a capability of the object-based storage system for processing an object IO request is not reached, and more object IO requests may further be processed. Therefore, the controller sends the received first object IO request to the storage device client. In this case, a quantity of to-be-processed object IO requests in the object-based storage system increases, and the to-be-processed quantity needs to be updated. In an actual operation, there is no strict sequence between sending the first object IO request to the storage device client by the controller and updating the to-be-processed quantity by the controller. The controller may first send the first object IO request to the storage device client, and then update the to-be-processed quantity; or may first update the to-be-processed quantity, and then send the first object IO request to the storage device client.

The to-be-processed quantity may be recorded by using a counter. When the to-be-processed quantity is updated, the counter is added by 1. Certainly, the to-be-processed quantity may also be recorded and updated in another manner. For example, statistics on the to-be-processed quantity may further be collected in a manner of counting down. Not all examples are described herein.

In an actual application, the controller may first add 1 to the to-be-processed quantity N, and then send the first object IO request to the storage device client; or may first send the first object IO request to the storage device client, and then add 1 to the to-be-processed quantity N. There is no strict limit to a sequence between the two operations.

The storage device client sends the first object IO request to a corresponding storage device for processing. After receiving the first object IO request, the storage device client allocates an interface to the received first object IO request, where the interface determines information about the storage device corresponding to the first object IO request. The storage device client sends the first object IO request to the storage device according to the determined information about the storage device. The storage device queues received object IO requests and processes the object IO requests one by one. After the first object IO request is processed, the storage device replies with a response message for the first object IO request to the storage device client, where the response message carries information about a processing result of the first object IO request.

For an object IO request that is processed successfully, the storage device replies with to the storage device client a response message that carries information indicating a processing success, and starts to process a next object IO request in a queue. When an object IO request cannot be processed in a timely manner, the storage device replies with an overload response message to the storage device client. For an object IO request that is not processed successfully due to a reason, for example, a device fault, signal loss, or the like, the storage device replies with to the storage device client a response message that carries information indicating a processing failure. After receiving the response message indicating the processing failure, the storage device client may resend the object IO request that is processed unsuccessfully to the storage device for processing, until a specific quantity of times is reached or a preset time limit for processing the object IO request is exceeded. If the storage device client receives no response message when a preset time ends, the storage device client may also resend the object IO request to the storage device for processing. When an object IO request is not processed successfully after a specific quantity of attempts, a response message carries a processing result indicating a final processing failure. The quantity of attempts is set by the object-based storage system according to a service requirement.

Step 207: The controller receives a response message replied by the storage device client for the first object IO request, where the response message carries a processing result indicating that the first object IO request is unsuccessfully or successfully processed.

The storage device client receives the response message replied by the storage device for the first object IO request, where the response message carries the processing result indicating that the first object IO request is unsuccessfully or successfully processed; then, the storage device client replies with the received response message to the controller.

After receiving the response message replied by the storage device client for the first object IO request, the controller replies with the response message to a requesting party of the first object IO request, and updates the to-be-processed quantity. A method for updating the to-be-processed quantity needs to be consistent with a method for updating the to-be-processed quantity when an object IO request is sent to the storage device client. For example, after sending one object IO request to the storage device client, the controller adds 1 to the to-be-processed quantity. In this case, when replying with one response message to a requesting party of the object IO request, the controller subtracts 1 from the to-be-processed quantity.

The to-be-processed quantity may also be updated when the controller receives the response message replied by the storage device client for the first object IO request. In other words, when receiving a response message replied by the storage device client for one object IO request, the controller updates the to-be-processed quantity, for example, subtracts 1 from the to-be-processed quantity. In this way, a quantity of to-be-processed object IO requests in the object-based storage system may be accurately recorded by increasing or decreasing the to-be-processed quantity.

When another object IO request is received, the controller compares a current value of the to-be-processed quantity with a current value of the processing quantity threshold, and determines whether to accept the object IO request according to a comparison result. When the current value of the to-be-processed quantity is greater than or equal to the current value of the processing quantity threshold, the object-based storage system cannot process another object IO request. If the another object IO request is further accepted and sent, by using the storage device client, to the storage device for processing, the storage device may use additional performance to reply with a system busy response message, which affects an object IO request that is being processed, causing an increase in a delay of the object IO request and an increase in a failure rate; eventually, performance of the storage device deteriorates. Therefore, when the current value of the to-be-processed quantity is greater than or equal to the current value of the processing quantity threshold, the controller directly replies with a reject response message or a busy response message to the requesting party of the object IO request, and discards the object IO request.

Step 209: The controller adjusts the processing quantity threshold according to a received processing result of an object IO request when a preset condition is met.

The preset condition may be a preset time period, a preset value of the to-be-processed quantity, or a preset difference between the to-be-processed quantity and the processing quantity threshold. When the preset condition is met, for example, the preset time period ends, the controller adjusts a value of the processing quantity threshold according to the received processing result of the object IO request. The processing result of the object IO request herein may be processing results of all object IO requests received by the controller, or processing results of object IO requests that are received by the controller within the time period. After the time period ends, the controller may delete all of the processing results of the received object IO requests and receive others, or retain the processing results of all the object IO requests, which is not limited in this embodiment of the present invention.

It should be noted that when the preset condition is met, it is possible that response messages are not necessarily received for all sent object IO requests. In other words, whether a response message is received for the first object IO request does not affect that the controller adjusts the processing quantity threshold according to a processing result of an object IO request that is carried in a received response message. Therefore, there is no strict sequence between step 207 and step 209.

A quantity of object IO requests that can be processed and temporarily stored by the storage device is limited. During peak service hours, each storage device needs to process a large quantity of object IO requests. When a speed of delivering object IO requests exceeds a processing capability and a cache capability of the storage device, some object IO requests cannot be processed. For an object IO request that cannot be processed in a timely manner, the storage device feeds back an overload response message to the storage device client, and the storage device client attempts to retry and resends the object IO request to the storage device. However, feeding back the overload response message occupies many disk resources of the storage device. In this way, performance of the storage device for processing an object IO request deteriorates, and a waiting time of an object IO request in a queue increases. As this cycle is repeated, processing performance of the storage device deteriorates, a waiting time of an object IO request increases, an object IO request cannot be processed in a timely manner, and a failure rate of processing an object IO request increases.

In this embodiment of the present invention, a controller controls a quantity of object IO requests that are sent to a storage device client. A processing quantity threshold represents a maximum value of a quantity of object IO request that can be processed by an object-based storage system, that is, a maximum value of a quantity of object IO requests that can be processed by storage devices in the object-based storage system. A quantity of object IO requests that can be processed by a storage device varies with occupation of resources of the storage device. Therefore, in this embodiment of the present invention, the controller dynamically adjusts a value of the processing quantity threshold according to a processing result of an object IO request, and controls a quantity of received object IO requests according to a processing quantity threshold that is obtained after adjustment, that is, controls a value of a to-be-processed quantity, so that a quantity of to-be-processed object IO requests does not exceed a processing capability of the object-based storage system, and all resources of the object-based storage system are used to effectively process the object IO requests, which improves processing performance and a success rate of the object-based storage system, and reduces a processing delay of an object IO request.

On a basis of the flowchart shown in FIG. 2-1, the service flow control method may further include the following steps, as shown in FIG. 2-2.

Step 202: The controller receives a second object IO request. An implementation method of step 202 is the same as that of step 201, which is not described herein and is not shown in FIG. 2-2.

Step 204: The controller acquires a current value of the processing quantity threshold and a current value of the to-be-processed quantity. An implementation method of step 204 is similar to that of step 202. Because the processing quantity threshold is dynamically adjusted by the controller according to a processing result of an object IO request, and the to-be-processed quantity is also adjusted according to a quantity of received object IO requests, after receiving an object IO request, the controller acquires a value of the to-be-processed quantity and the processing quantity threshold that are currently stored in the controller. Step 204 is not described herein again, and is not shown in FIG. 2-2.

Step 206: If the current value of the to-be-processed quantity is greater than or equal to the current value of the processing quantity threshold, the controller replies with a reject response message or a busy response message.

After acquiring the current value of the processing quantity threshold and the current value of the to-be-processed quantity, the controller compares the two values, and executes step 205 and a method described below when the current value of the to-be-processed quantity is less than the current value of the processing quantity threshold, which is not described herein. When the current value of the to-be-processed quantity is greater than or equal to the current value of the processing quantity threshold, a quantity of to-be-processed object IO requests has exceeded or reached a processing capability of the object-based storage system. If another object IO request is further received, pressure is surely imposed on the object-based storage system, and the object-based storage system needs to use resources to process these overload object IO requests, which affects performance of the entire object-based storage system and reduces processing efficiency. Therefore, when the current value of the to-be-processed quantity is greater than or equal to the current value of the processing quantity threshold, the controller no longer accepts another object IO request, and the controller replies with a reject response message or a busy response message to a client that sends the second object IO request. Moreover, the controller may further discard the second object IO request.

When the current value of the to-be-processed quantity is greater than or equal to the current value of the processing quantity threshold, the controller no longer accepts another object IO request, but directly replies with a reject response message or a busy response message to a requesting party that sends an object IO request, to control a quantity of object IO requests that are sent, by using the storage device client, to the storage device for processing. This avoids congestion caused because excessive object IO requests are sent to the storage device, which improves efficiency of the object-based storage system for processing an object IO request and reduces a delay of an object IO request.

Figures 2, 3:
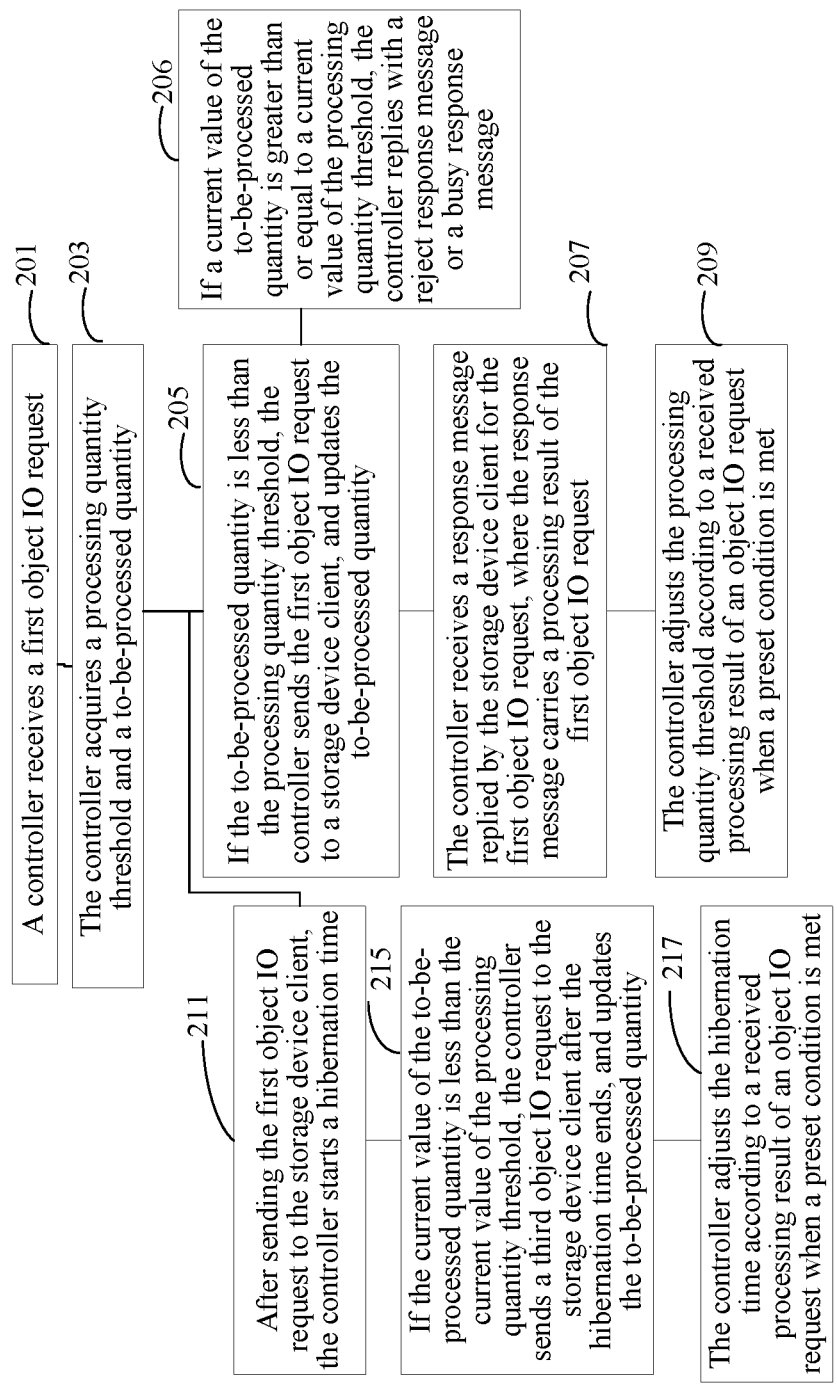
Figure 3:
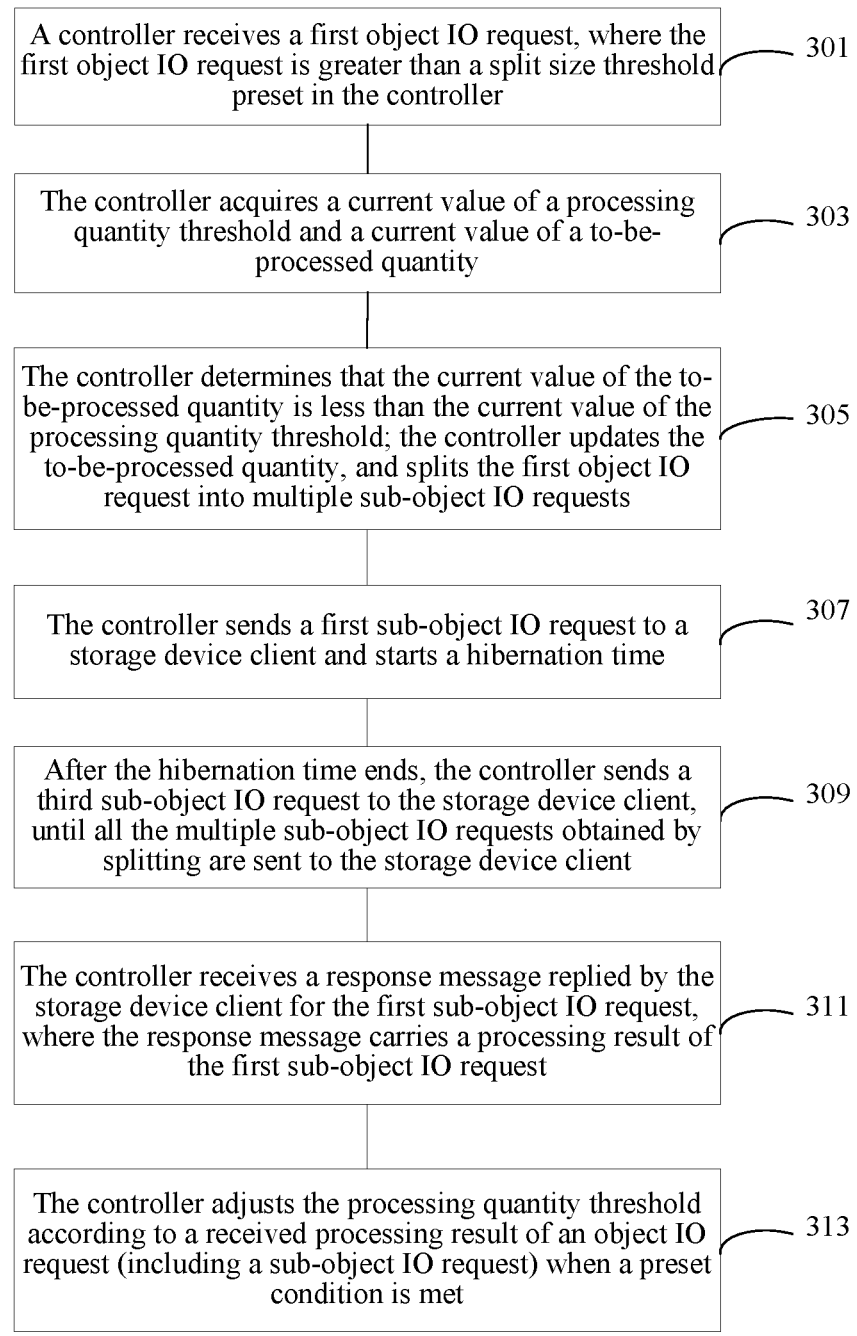

FIG. 2-3 shows another implementation manner of the method for performing service flow control in an object-based storage system. On a basis of the method procedures shown in FIG. 2-1 and FIG. 2-2, a time interval for sending an object IO request to the storage device client by the controller is added. A specific method procedure is as follows:

Step 211: After sending the first object IO request to the storage device client, the controller starts a hibernation time. The hibernation time is a time interval between sending two object IO request by the controller to the storage device client. The controller may record the hibernation time by using a timer, where starting the hibernation time may be starting the timer.

Step 213: The controller receives a third object IO request, and acquires a current value of the processing quantity threshold and a current value of the to-be-processed quantity. An implementation method of step 213 is the same as that of step 201, which is not described herein and is not shown in FIG. 2-3.

There is no strict sequence between step 213 and step 211. In other words, the controller may receive the third object IO request before starting the hibernation time, or may receive the third object IO request after starting the hibernation time.

Step 215: If the current value of the to-be-processed quantity is less than the current value of the processing quantity threshold, the controller sends the third object IO request to the storage device client after the hibernation time ends, and updates the to-be-processed quantity.

The controller compares the acquired current value of the processing quantity threshold with the acquired current value of the to-be-processed quantity. When the current value of the to-be-processed quantity is less than the current value of the processing quantity threshold, the object-based storage system may further accept another object IO request, and the controller may send a received third object IO request to the storage device client for processing. A difference between this method procedure and the foregoing two method procedures lies in that: after determining that the current value of the to-be-processed quantity is less than the current value of the processing quantity threshold, the controller does not immediately send the third object IO request to the storage device client, but needs to wait until the hibernation time ends, and then sends the third object IO request to the storage device client. In other words, after sending the first object IO request to the storage device client, the controller needs to wait for a specific time interval (that is, the hibernation time), and then sends the third object IO request to the storage device client. The storage device client sends the third object IO request to a corresponding storage device for processing.

In this way, a time for sending an object IO request to the storage device may be adjusted, so that the storage device can have more time to process the object IO request, which avoids congestion of object IO requests on the storage device, and ensures that all resources of the storage device are used to process the object IO request, thereby improving efficiency of the entire object-based storage system for processing an object IO request.

A manner and time for updating the to-be-processed quantity are the same as those described in the foregoing embodiments, which are not described herein again.

The hibernation time may be recorded by using a timer, where a time interval may be recorded in a counting manner, or a time interval may be recorded in a countdown manner.

Step 217: The controller adjusts the hibernation time according to a received processing result of an object IO request when a preset condition is met.

The preset condition may be a preset time period or a preset value of the hibernation time. When the preset condition is met, for example, the preset time period ends, the controller adjusts a value of the hibernation time according to the received processing result of the object IO request. The processing result of the object IO request herein may be processing results of all object IO requests received by the controller, or processing results of object IO requests that are received by the controller within the time period. After the time period ends, the controller may delete all of the processing results of the received object IO requests and receive others, or retain the processing results of all the object IO requests, which is not limited in this embodiment of the present invention.

When the preset condition is met, it is possible that response messages are not necessarily received for all sent object IO requests. In other words, whether a response message is received for a sent object IO request does not affect that the controller adjusts the hibernation time according to a received response message. Therefore, a step of receiving a response message for the third object IO request is not described herein.

In this embodiment of the present invention, the hibernation time may be adjusted by the controller by using a received processing result of an object IO request. In this way, the controller may control, by controlling a time interval for sending an object IO request to the storage device for processing, a quantity of object IO requests sent to the storage device for processing, which ensures that the quantity of object IO requests sent to the storage device for processing does not exceed a processing capability of the storage device, prevents congestion of object IO requests on the storage device, improves efficiency of processing an object IO request in the object-based storage system, and reduces a delay of an object IO request.

To implement that the controller dynamically adjusts the processing quantity threshold or the hibernation time described above according to a received processing result of an object IO request, the controller needs to collect statistics on and analyze the processing result of the object IO request. In this embodiment of the present invention, the controller dynamically adjusts the processing quantity threshold or the hibernation time according to a processing success rate of an object IO request. It may be understood that the controller may also dynamically adjust the processing quantity threshold or the hibernation time according to a processing failure rate of an object IO request; or the controller may also dynamically adjust the processing quantity threshold or the hibernation time according to the processing success rate or the processing failure rate of an object IO request and another factor.

Dynamic adjustment may be performed according to a specific time rule, or may be performed after a specific quantity of object IO requests is sent to the storage device client. This embodiment of the present invention is described by using an example in which the controller periodically adjusts the processing quantity threshold or the hibernation time.

To implement that the controller periodically adjusts the processing quantity threshold or the hibernation time according to a received processing result of an object IO request, a sent quantity and a successfully processed quantity need to be recorded in the controller. The sent quantity refers to a quantity of object IO requests that are sent by the controller to the storage device client; the successfully processed quantity refers to a quantity of object IO requests successfully processed among the object IO requests that are sent by the controller to the storage device client. The sent quantity may be recorded by setting a counter in the controller; the successfully processed quantity may also be recorded by setting a counter in the controller.

The sent quantity may be updated in two manners. In one manner, the sent quantity is updated after the controller sends one object IO request to the storage device client. For example, a currently recorded sent quantity is added by 1. In another manner, the sent quantity is updated after the controller sends an object IO request to the storage device client and receives a response message replied by the storage device client for the object IO request. For example, a currently recorded sent quantity is added by 1. In the second manner, the currently recorded sent quantity needs to be added by 1 provided that one response message is received, regardless of whether the replied response message is a response message indicating a processing success or a response message indicating a processing failure.

The latter updating manner is specifically as follows: after the controller sends one object IO request to the storage device client, the storage device client sends the received object IO request to a storage device for processing. The storage device replies with a response message to the storage device client, where the response message carries a processing result of the object IO request, for example, a processing failure or a processing success; then, the storage device client replies with the response message to the controller. After receiving the response message, the controller updates the currently recorded sent quantity, for example, adds 1 to the currently recorded sent quantity.

A manner for updating the successfully processed quantity is that: when receiving a response message replied by the storage device client for an object IO request, the controller updates the successfully processed quantity if a processing result carried in the response message indicates a processing success, for example, adds 1 to the currently recorded successfully processed quantity.

When a preset time period ends, the controller acquires a current value of the sent quantity and a current value of the successfully processed quantity, calculates a processing success rate of an object IO request, and adjusts the processing quantity threshold or the hibernation time by using the processing success rate obtained after calculation as a first adjustment coefficient. The processing success rate may be that: Success rate=Current value of the successfully processed quantity/Current value of the sent quantity×100%.

Through constant observations and experiments, it is found that a capability of an object-based storage system for processing an object IO request varies with a sent quantity and a success rate. Therefore, in this embodiment of the present invention, it is provided to adjust, according to another adjustment coefficient, a processing quantity threshold or a hibernation time that is obtained after adjustment is performed according to a success rate. For the processing quantity threshold, an adjustment coefficient is proportional to a processing success rate. For the hibernation time, an adjustment coefficient is inversely proportional to a processing success rate. To describe a relationship between coefficients more clearly, the processing success rate is referred to as a first adjustment coefficient; an adjustment coefficient for adjusting the processing quantity threshold is referred to as a second adjustment coefficient; and an adjustment coefficient for adjusting the hibernation time is referred to as a third adjustment coefficient. The second adjustment coefficient is a constant, and a value of the second adjustment coefficient is proportional to that of the first adjustment coefficient; that is, a larger value of the first adjustment coefficient indicates a larger value of the second adjustment coefficient. The third adjustment coefficient is a constant, and a value of the third adjustment coefficient is inversely proportional to that of the first adjustment coefficient; that is, a larger value of the first adjustment coefficient indicates a smaller value of the third adjustment coefficient.

In addition, a quantity of object IO requests that can be processed by an object-based storage system is limited, and cannot be increased or decreased without a limit. Therefore, an upper limit and a lower limit of a processing quantity threshold may be preset in the controller. The upper limit of the processing quantity threshold is a maximum quantity of object IO requests that can be processed by the object-based storage system; the lower limit of the processing quantity threshold is a minimum quantity of object IO requests that can be processed by the object-based storage system. When a processing quantity threshold that is obtained by calculating by the controller according to the first adjustment coefficient or the first adjustment coefficient and the second adjustment coefficient is not between the upper limit and the lower limit of the processing quantity threshold, the processing quantity threshold obtained after calculation needs to be modified. For example, if the processing quantity threshold that is obtained by calculating by the controller according to the first adjustment coefficient or the first adjustment coefficient and the second adjustment coefficient is greater than the upper limit of the processing quantity threshold, the obtained processing quantity threshold is adjusted to be equal to the upper limit of the processing quantity threshold; if the processing quantity threshold that is obtained by calculating by the controller according to the first adjustment coefficient or the first adjustment coefficient and the second adjustment coefficient is less than the lower limit of the processing quantity threshold, the obtained processing quantity threshold is adjusted to be equal to the lower limit of the processing quantity threshold.

Similarly, the hibernation time of the object-based storage system also needs to be limited. Therefore, an upper limit and a lower limit of the hibernation time may also be preset in the controller. A hibernation time that is obtained by the controller by performing adjustment according to the first adjustment coefficient or the first adjustment coefficient and the third adjustment coefficient needs to be between the preset upper limit and the preset lower limit of the hibernation time. If a hibernation time that is obtained by calculating by the controller according to the first adjustment coefficient or the first adjustment coefficient and the third adjustment coefficient is not between the preset upper limit and the preset lower limit of the hibernation time, the hibernation time obtained after calculation needs to be modified according to the upper limit and the lower limit of the hibernation time. For example, if the hibernation time that is obtained by calculating by the controller according to the first adjustment coefficient or the first adjustment coefficient and the third adjustment coefficient is greater than the set upper limit of the hibernation time, the obtained hibernation time is adjusted to be equal to the upper limit of the hibernation time; or if the hibernation time that is obtained by calculating by the controller according to the first adjustment coefficient or the first adjustment coefficient and the third adjustment coefficient is less than the set lower limit of the hibernation time, the obtained hibernation time is adjusted to be equal to the lower limit of the hibernation time.

The following describes how to adjust a processing quantity threshold and a hibernation time according to a preset time period by using a specific example.

In this method embodiment, a time period is preset to 1 minute, and is stored in the controller. A person skilled in the art may understand that the time period may be set to another value as required. For example, the time period is set to 30 seconds. The time period may be recorded by setting a timer in the controller. When the preset time period ends, the controller is triggered to acquire a current sent quantity and a current successfully processed quantity, and adjust a processing quantity threshold and/or a hibernation time. In other words, in this embodiment of the present invention, the controller adjusts the processing quantity threshold and/or the hibernation time every minute.

First, a method for adjusting a processing quantity threshold according to a preset time period is described by using an example.

$M = M_1 \times r_1 \times \rho_m$, where M is a new processing quantity threshold that is obtained after adjustment, $M_1$ is a current value of a processing quantity threshold, $r_1$ is a current value of a first adjustment coefficient, and $\mu_m$ is a value of a second adjustment coefficient relative to that of the first adjustment coefficient. $\mu_m$ is proportional to r; that is, a larger first adjustment coefficient r indicates a larger second adjustment coefficient and a smaller first adjustment coefficient r indicates a smaller second adjustment coefficient $\mu$. $r_1$ is a ratio of a current value of a successfully processed quantity to a current value of a sent quantity: $r_1 = (p_1/q_1) \times 100\%$, where $p_1$ is the current value of the successfully processed quantity, and $q_1$ is the current value of the sent quantity.

In this embodiment, the processing quantity threshold is adjusted by using a piecewise function. A calculation formula is as follows:

$$M = M_{Min} (r_1 < 0.2);$$

$$M = M_1 \times r_1 \times 0.6 (0.2 \le r_1 < 0.6);$$

$$M = M_1 \times r_1 \times 0.8 (0.6 \le r_1 < 0.8);$$

$$M = M_1 \times r_1 \times 1.0 (0.8 \le r_1 < 0.95);$$

$$M = M_1 \times r_1 \times 1.1 (M_1 < M_{Max}, \text{ and } r_1 \ge 0.95); \text{ and}$$

$$M = M_{Max} (M_1 = M_{Max}, \text{ and } r_1 \ge 0.95).$$

$M_{Min}$ is a lower limit of the processing quantity threshold, $M_{Max}$ is an upper limit of the processing quantity threshold, and the upper limit and the lower limit of the processing quantity threshold are preset. Before a service is started, an initial value of M is set to $M = M_{Max}$, and an initial value of $r_1$ is set to 100%. As the service continues, when the preset time period ends, the controller performs calculation and adjustment according to a current value of $r_1$ and by selecting a corresponding formula, to obtain a new value of the processing quantity threshold.

The following describes a method for adjusting a hibernation time according to a preset time period by using an example.

$t = (t_1 + \text{Constant})/r_1 \times \mu_t$, where t is a new hibernation time obtained after adjustment, $t_1$ is a current value of a hibernation time, $r_1$ is a current value of a first adjustment coefficient, and $\mu_t$ is a value of a third adjustment coefficient relative to that of the first adjustment coefficient. $\mu_t$ is inversely proportional to r; that is, a larger first adjustment coefficient r indicates a smaller third adjustment coefficient $\mu_t$, and a smaller first adjustment coefficient r indicates a larger third adjustment coefficient $\mu_t$. $r_1$ is a ratio of a current value of a successfully processed quantity to a current value of a sent quantity: $r_1 = (p_1/q_1) \times 100\%$, where $p_1$ is the current value of the successfully processed quantity, and $q_1$ is the current value of the sent quantity.

In this embodiment, the hibernation time is adjusted by using a piecewise function. A calculation formula is as follows:

$$t = t_{MaxDelay} (r_1 < 0.2);$$

$$t = (t_1 + 15)/r_1 \times 1.6 (0.2 \le r_1 < 0.6);$$

$$t = (t_1 + 15)/r_1 \times 1.4 (0.6 \le r_1 < 0.8);$$

$$t = (t_1 + 15)/r_1 \times 1.0 (0.8 \le r_1 < 0.95);$$

$$t = (t_1 + 0)/r_1 \times 0.9 (t_1 \ge t_{Threshold}, \text{ and } r_1 \ge 0.95); \text{ and}$$

$$t = t_{MinDelay} (t_1 < t_{Threshold}, \text{ and } r_1 \ge 0.95).$$

$t_{MinDelay}$ is an a lower limit of the hibernation time, $t_{MaxDelay}$ is upper limit of the hibernation time, and the upper limit and the lower limit of the hibernation time are preset. In this embodiment, the lower limit of the hibernation time is set to 0, and the hibernation time is in milliseconds.

A size of each object IO request is different. Generally, a split size threshold of an object IO request is preset in the controller; an object IO request greater than the split size threshold is referred to as a large object IO request, and an object IO request less than the split size threshold is referred to as a small object IO request. The split size threshold refers to a size of an object IO request that can be processed by the object-based storage system. When an object IO request accepted by the controller is greater than the split size threshold, that is, the accepted object IO request is a large object IO request, the controller splits the large object IO request into multiple sub-object IO requests, where none of the sub-object IO requests obtained by splitting is greater than the split size threshold, the sub-object IO requests obtained by splitting carry a same identifier, and the same identifier is used to indicate that the sub-object IO requests are obtained by splitting a same large object IO request. Generally, the controller splits the large object IO request according to the split size threshold.

For example, a preset split size threshold of an object IO request is 1 megabyte (M). When a first object IO request accepted by the controller is 4.5 M, the first object IO request is a large object IO request, and the controller splits the first object IO request into multiple sub-object IO requests according to the split size threshold. In this embodiment of the present invention, the controller splits the first object IO request into five sub-object IO requests in a unit of 1 M, where the five sub-object IO requests and their sizes may respectively be: a first sub-object IO request, 1 M; a second sub-object IO request, 1 M; a third sub-object IO request, 1 M; a fourth sub-object IO request, 1 M; and a fifth sub-object IO request, 0.5 M. Moreover, the five sub-object IO requests carry a same identifier.

A manner in which the controller processes a large object IO request is described by using an example in which the first object IO request described above is a large object IO request (that is, a size of the first object IO request is greater than the split size threshold). A procedure thereof is shown in FIG. 3. The manner of processing a large object IO request is partially the same as the manner of processing an object IO request described in FIG. 2-1 or FIG. 2-2 and the corresponding text descriptions. Descriptions of a same portion will not be described in detail again.

Step 301: The controller receives a first object IO request, where the first object IO request is greater than a split size threshold preset in the controller. The split size threshold refers to a size of an object IO request that can be processed by the object-based storage system. Step 301 is similar to step 201 except for that the first object IO request is a large object IO request in this case.

Step 303: The controller acquires a current value of a processing quantity threshold and a current value of a to-be-processed quantity. Step 303 is similar to step 203.

Step 305: The controller determines that the current value of the to-be-processed quantity is less than the current value of the processing quantity threshold; the controller updates the to-be-processed quantity, and splits the first object IO request into multiple sub-object IO requests, where a size of each sub-object IO request is not greater than the split size threshold and each sub-object IO request carries a same identifier. In this case, a method used by the controller to update the to-be-processed quantity is the same as that described in step 205.

There is no requirement on a sequence between updating the to-be-processed quantity and splitting the first object IO request into the multiple sub-object IO requests, where the to-be-processed quantity may be updated before the first object IO request is split, or the first object IO request may be split before the to-be-processed quantity is updated, or the two may be performed at the same time.

It should be noted that in step 205, when the controller sends the first object IO request to a storage device client, the to-be-processed quantity is added by one unit, that is, the to-be-processed quantity is added by 1. In this embodiment, the first object IO request is split into the multiple sub-object IO requests and sent to the storage device client. In this case, the to-be-processed quantity is also added by one unit, that is, the to-be-processed quantity is added by 1. The to-be-processed quantity refers to a quantity of to-be-processed object IO requests accepted by the controller, which is unrelated to a quantity of sub-object IO requests into which an accepted object IO request is split.

When the storage device client is an IP disk client and a storage device is an IP disk, the IP disk client allocates a same interface to IO requests carrying a same identifier. In other words, multiple object IO write requests obtained by splitting a large IO write request are processed by one interface of the IP disk client. The interface calculates a Key value of an allocated object IO request, acquires information about a corresponding IP disk according to the Key value, and sends the object IO write request to the corresponding IP disk for processing. After one IO request is split into multiple IO requests, because each IO request obtained by splitting has a different Key value, it is possible that the IO requests obtained by splitting is sent to different IP disks for processing. The IP disk client may perform concurrent processing and process multiple IO requests simultaneously, to send the IO requests to corresponding IP disks by using Key values obtained after calculation.

Metadata and data of a small object IO request may be separately stored; that is, different Key values are used for the metadata and the data. The metadata and the data may also be stored together; that is, the metadata and the data share one Key value. When the metadata and the data are stored together, a sum of sizes of the metadata and the data cannot exceed the split size threshold. When the metadata and the data are separately stored, a Key value of the metadata is a container name and an object name, and a key value of the data is a string that is randomly generated according to the data. Because different Key values are used for the metadata and the data, the metadata and the data may be stored on a same IP disk or may be stored on different IP disks. When the metadata and the data are stored together and when the metadata and the data share one Key value, the metadata and the data are stored together at a same location. When the metadata and the data are stored together, only one IO operation needs to be performed. An existing technical solution may be used to implement sending the object IO request to a corresponding IP disk for processing, which is not described in detail herein.

Step 307: The controller sends a first sub-object IO request obtained by splitting to a storage device client, and starts a hibernation time.

Step 309: After the hibernation time ends, the controller sends a second sub-object IO request to the storage device client, and repeats this cycle until the multiple sub-object IO requests obtained by splitting are sent.

The hibernation time in this step is essentially the same as the hibernation time described above, and an adjusting method thereof is also the same, which are not described herein again.

The storage device client and a storage device process a received sub-object IO request in a same manner as that for processing a received object IO request, and an existing implementation manner may be used; therefore, no further description is provided herein. After processing the sub-object IO request, the storage device replies with a corresponding response message to the storage device client, and then, the storage device client replies with the corresponding response message to the controller. The response message carries a processing result of a corresponding object IO request. These processes are described in detail above, and are not described herein again.

Step 311: The controller receives a response message replied by the storage device client for the first sub-object IO request, where the response message carries a processing result of the first sub-object IO request; and the controller further receives response messages of other multiple sub-object IO requests obtained by splitting.

Step 313: The controller adjusts the processing quantity threshold according to a received processing result of an object IO request (including a sub-object IO request) when a preset condition is met.

A method in step 313 is the same as the method described in step 209, and is not described herein again. In addition, similarly, there is no strict sequence between step 313 and step 311. In other words, that the controller adjusts the processing quantity threshold according to the received processing result of the object IO request (including the sub-object IO request) is not affected by whether the controller receives a response message for the first sub-object IO request or another sub-object IO request.

It should be noted that splitting a large object IO request affects a sent quantity and a successfully processed quantity that are recorded in the controller. The sent quantity refers to a quantity of object IO requests that are sent by the controller to the storage device client; the successfully processed quantity refers to a quantity of object IO requests successfully processed among the object IO requests that are sent by the controller to the storage device client. Therefore, in a case in which a large object IO request is split, the controller sends not one object IO request but multiple sub-object IO requests obtained by splitting to the storage device client. In other words, the sent quantity refers to a quantity of object IO requests that are actually sent by the controller to the storage device client, regardless of whether it is an object IO request that is not split or a sub-object IO request that is obtained by splitting. Similarly, the successfully processed quantity refers to a quantity of object IO requests that are sent by the controller to the storage device client, including an object IO request that is not split and a sub-object IO request that is obtained by splitting.

Therefore, after sending the first sub-object IO request to the storage device client, the controller updates the sent quantity, for example, adds 1 to the sent quantity. When the controller receives the response message for the first sub-object IO request, if the response message for the first sub-object IO request carries a processing result indicating a processing success, the controller further needs to update the successfully processed quantity, for example, adds 1 to the successfully processed quantity; or if the response message for the first sub-object IO request carries a processing result indicating a processing failure, the controller does not update the successfully processed quantity; that is, the successfully processed quantity remains unchanged.

Similarly, after sending the second sub-object IO request to the storage device, the controller adds 1 to the sent quantity. After the controller receives a response message replied by the storage device client for the second sub-object IO request, if the response message for the second sub-object IO request carries a processing result indicating a processing success, the controller adds 1 to the successfully processed quantity. Optionally, after sending the first sub-object IO request to the storage device client and after receiving a response message for the first sub-object IO request, the controller may also update the sent quantity, for example, add 1 to the sent quantity. In this case, it is further necessary to determine, according to the processing result in the response message for the first sub-object IO request, whether to update the successfully processed quantity. A specific manner is the same as the manner described above, and is not described herein again. Similarly, after receiving the response message for the sent second sub-object IO request, the controller adds 1 to the sent quantity, and then determines, according to a response message of the second sub-object IO request, whether to update the successfully processed quantity.

In a case in which a large object IO request is split, a manner of adjusting the processing quantity threshold and the to-be-processed quantity is the same as the manner described above, except that, specifically, the sent quantity and the successfully processed quantity are counted differently, which is not described herein again.

It should be noted that if a processing result of any one of multiple sub-object IO requests that are obtained by splitting a large object IO request indicates a processing failure, the large object IO request is processed unsuccessfully. In this case, the controller needs to reply with a response message indicating the processing failure to a requesting party of the large object IO request, and instruct the storage device client to delete other sub-object IO requests that are obtained by splitting the large object IO request and that have been written into a storage device. When receiving a response message of any sub-object IO request indicating a processing failure, the controller may further resend the sub-object IO request that is processed unsuccessfully to the storage device client; a response message received after a specific quantity of attempts or a specific period of time is a final result.

In addition, after being split in a client, the large object IO request may also be sent to the controller for corresponding processing. In this case, a split size threshold of an object IO request is preset in the client; the client splits the large object IO request according to the split size threshold, and then sends sub-object IO requests to the controller one by one. For the controller, regardless of whether a sub-object IO request obtained by splitting by the client or an object IO request that is not split is received, a processing manner thereof is the same as the processing manner in FIG. 2, FIG. 3, FIG. 4, and the corresponding text descriptions, and is not described herein again.

As described above, in a case in which the controller splits a received large object IO request into multiple sub-object IO requests, the controller may also dynamically adjust the processing quantity threshold and the to-be-processed quantity according to a specific rule and a processing result of an object IO request or a sub-object IO request, to control a quantity of object IO requests accepted by the object-based storage system. This ensures that a quantity of object IO requests accepted by the controller does not exceed a processing capability of a storage device in the object-based storage system, and ensures performance of the entire object-based storage system for processing an object IO request.

Figure 4:
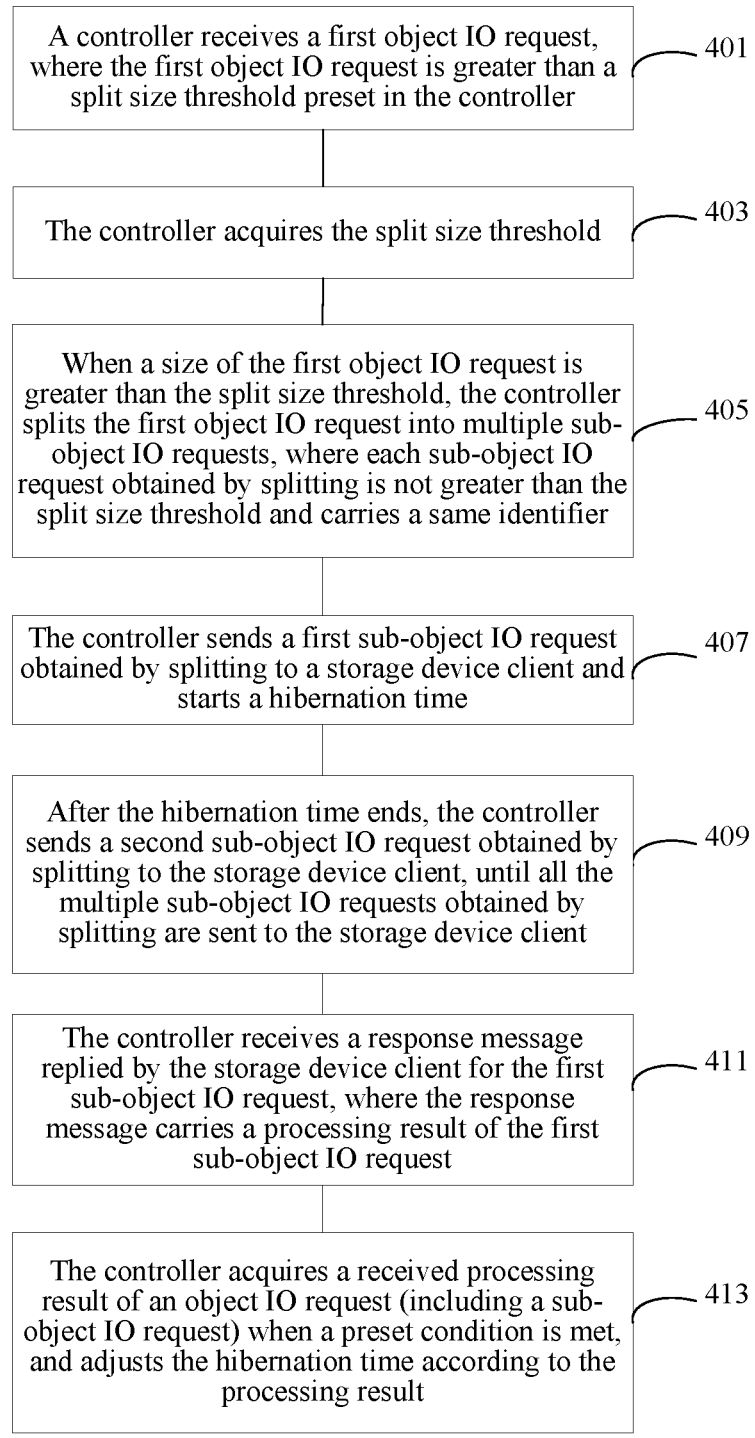
FIG. 4 is a procedure of yet another service flow control method in an object-based storage system.

Another embodiment of the present invention discloses another method for service flow control in an object-based storage system. In the method, a hibernation time is started for a sub-object IO request obtained by splitting, to adjust a quantity of object IO requests sent to a storage device client and a storage device in the object-based storage system, and dynamically adjust the hibernation time according to a specific rule and a processing result of an object IO request that is replied by the storage device and the storage device client, thereby ensuring performance of the object-based storage system for processing an object IO request. FIG. 4 shows a specific implementation procedure of the method. The method is applicable to the object-based storage system shown in FIG. 1, where a related explanation of the object-based storage system is not described again.

Step 401: A controller receives a first object IO request, where the first object IO request is greater than a split size threshold preset in the controller. The split size threshold refers to a size of an object IO request that can be processed by the object-based storage system. This step is similar to step 201, and is not described in detail herein.

Step 403: The controller acquires the split size threshold.

Step 405: When a size of the first object IO request is greater than the split size threshold, the controller splits the first object IO request into multiple sub-object IO requests, where each sub-object IO request obtained by splitting is not greater than the split size threshold and carries a same identifier. Generally, the controller splits the first object IO request according to the split size threshold. For example, the split size threshold is 1 megabyte (M), the first object IO request is 3.7 M, and the controller splits the first object IO request according to the split size threshold into four sub-object IO requests: a first sub-object IO request, 1 M; a second sub-object IO request, 1 M; a third sub-object IO request, 1 M; and a fourth sub-object IO request, 0.7 M.

Step 407: The controller sends the first sub-object IO request obtained by splitting to the storage device client and starts a hibernation time. A manner in which the storage device client processes the first sub-object IO request is the same as the manner described in step 203 in which the storage device client processes an object IO request, which is not described herein again.

The controller may record the hibernation time by using a timer, where starting the hibernation time may be starting the timer. The hibernation time may be recorded by using a timer, where a time interval may be recorded in a counting manner, or a time interval may be recorded in a countdown manner.

Step 409: After the hibernation time ends, the controller sends a second sub-object IO request obtained by splitting to the storage device client, and repeats the cycle until the controller sends all the multiple sub-object IO requests obtained by splitting to the storage device client. A manner in which the storage device client processes the second sub-object IO request and another sub-object IO request is the same as the manner in which the storage device client processes the first sub-object IO request or another object IO request, which is not described again.

Step 411: The controller receives a response message replied by the storage device client for the first sub-object IO request, where the response message carries a processing result of the first sub-object IO request. The processing result may be a final result indicating a processing success or a processing failure.

It should be noted that there is no strict limit to a sequence between step 409 and step 411, and the two do not affect each other. In other words, for the first sub-object IO request, a step in which the controller sends the first sub-object IO request to the storage device client is always before a step in which the controller receives the response message for the first sub-object IO request from the storage device client. However, there is no requirement on a sequence between a step in which the controller sends the second sub-object IO request to the storage device client and the step in which the controller receives the response message for the first sub-object IO request from the storage device client; and the two steps are implemented alternately and are mutually independent. For example, the controller needs to send the second sub-object IO request to the storage device client after the hibernation time following the sending of the first sub-object IO request ends. However, the response message for the first sub-object IO request may be received by the controller before the second sub-object IO request is sent or after the second sub-object IO request is sent.

Step 413: The controller adjusts the hibernation time according to a received processing result of an object IO request (including a sub-object IO request) when a preset condition is met.

It should be noted that there is no strict sequence relationship between step 413 and step 411. When the preset condition is met, the controller may have received the response message replied by the storage device client for the first sub-object IO request, or the controller may have not received the response message replied by the storage device client for the first sub-object IO request. It is also possible that the controller has received response messages replied by the storage device client for the first sub-object IO request and the second sub-object IO request, but has not received responses message of the third sub-object IO request and the fourth sub-object IO request. In this case, the controller adjusts the hibernation time according to a replied response message of another object IO request or another sub-object IO request, and a processing result in the response message.

In this way, the controller may control, by controlling a time interval for sending an object IO request to the storage device for processing, a quantity of object IO requests sent to the storage device for processing, which ensures that the quantity of object IO requests sent to the storage device for processing does not exceed a processing capability of the storage device, prevents congestion of object IO requests on the storage device, improves efficiency of processing an object IO request in the object-based storage system, and reduces a delay of an object IO request.

The method may further include step 415: When receiving response messages of all sub-object IO requests obtained by splitting the first object IO request, the controller replies with, according to processing results carried in the response messages of all the sub-object IO requests obtained by splitting the first object IO request, a response message for the first object IO request to a requesting party that sends the first object IO request, where the response message for the first object IO request carries a processing result of the first object IO request. When the response messages of all the sub-object IO requests obtained by splitting the first object IO request carry processing results indicating a processing success, the controller replies with a response message for the first object IO request carrying a result indicating a processing success to the requesting party of the first object IO request; otherwise, the controller replies with a response message for the first object IO request carrying a result indicating a processing failure to the requesting party of the first object IO request.

When replying with the response message for the first object IO request to the requesting party of the first object IO request, the controller updates a to-be-processed quantity. Similar to that in the method described above, the controller subtracts 1 from the to-be-processed quantity, where a specific processing method is not described again.

To implement that the controller dynamically adjusts the hibernation time according to received processing results of an object IO request and a sub-object IO request, the controller needs to collect statistics on and analyze the processing results of the object IO request and the sub-object IO request. In this embodiment of the present invention, the controller dynamically adjusts the hibernation time according to processing success rates of the object IO request and the sub-object IO request. It may be understood that the controller may also dynamically adjust the hibernation time according to processing failure rates of the object IO request and the sub-object IO request; or the controller may also dynamically adjust the hibernation time according to a processing success rate or a processing failure rate of an object IO request, and another factor.

Dynamic adjustment may be performed according to a specific time rule, or may be performed after the hibernation time reaches a specific value. This embodiment of the present invention is described by using an example in which the controller periodically adjusts the hibernation time.

To implement that the controller periodically adjusts the hibernation time according to received processing results of an object IO request and a sub-object IO request, a sent quantity and a successfully processed quantity need to be recorded in the controller. The sent quantity refers to quantities of object IO requests and sub-object IO requests that are sent by the controller to the storage device client; the successfully processed quantity refers to quantities of object IO requests and sub-object IO requests successfully processed among the object IO requests and the sub-object IO requests that are sent by the controller to the storage device client. The sent quantity may be recorded by setting a counter in the controller; the successfully processed quantity may also be recorded by setting a counter in the controller.

The sent quantity may be updated in two manners. In one manner, the sent quantity is updated after the controller sends one object IO request to the storage device client. For example, a currently recorded sent quantity is added by 1. In another manner, the sent quantity is updated after the controller sends an object IO request to the storage device client and receives a response message replied by the storage device client for the object IO request. For example, a currently recorded sent quantity is added by 1. In the second manner, the currently recorded sent quantity needs to be added by 1 provided that one response message is received, regardless of whether the replied response message is a response message indicating a processing success or a response message indicating a processing failure. An updating manner is the same when the controller sends a sub-object IO request to the storage device client. That is, after sending one sub-object IO request to the storage device client, the controller adds 1 to the currently recorded sent quantity, or after sending one sub-object IO request to the storage device client and after receiving a response message replied by the storage device client for the sub-object IO request, the controller adds 1 to the currently recorded sent quantity. A manner of updating the successfully processed quantity is that: when receiving a response message replied by the storage device client for one object IO request or sub-object IO request, if a processing result carried in the response message indicates a processing success, the controller updates the successfully processed quantity, for example, adds 1 to the currently recorded successfully processed quantity. When a preset time period ends, the controller acquires a current value of the sent quantity and a current value of the successfully processed quantity, calculates a processing success rate, and adjusts the hibernation time by using the processing success rate obtained after calculation as a first adjustment coefficient. The processing success rate may be a ratio of the successfully processed quantity to the sent quantity.

Through constant observations and experiments, it is found that a capability of an object-based storage system for processing an object IO request varies with a sent quantity and a success rate. Therefore, in this embodiment of the present invention, it is provided to adjust, according to another adjustment coefficient, a hibernation time that is obtained by performing adjustment according to a success rate, where the adjustment coefficient is inversely proportional to a processing success rate. To describe a relationship between coefficients more clearly, the processing success rate is referred to as a first adjustment coefficient; and an adjustment coefficient for adjusting a hibernation time is referred to as a third adjustment coefficient. The third adjustment coefficient is a constant, and a value of the third adjustment coefficient is inversely proportional to that of the first adjustment coefficient.

In addition, the hibernation time of the object-based storage system cannot be increased or decreased without a limit. Therefore, the hibernation time of the object-based storage system needs to be limited. An upper limit and a lower limit of the hibernation time may be preset in the controller. A hibernation time that is obtained by the controller by performing adjustment according to the first adjustment coefficient or the first adjustment coefficient and the third adjustment coefficient needs to be between the preset upper limit and the preset lower limit of the hibernation time. If a hibernation time that is obtained by calculating by the controller according to the first adjustment coefficient or the first adjustment coefficient and the third adjustment coefficient is not between the preset upper limit and the preset lower limit of the hibernation time, the hibernation time obtained after calculation needs to be modified according to the upper limit and the lower limit of the hibernation time. For example, if the hibernation time that is obtained by calculating by the controller according to the first adjustment coefficient or the first adjustment coefficient and the third adjustment coefficient is greater than the set upper limit of the hibernation time, the obtained hibernation time is adjusted to be equal to the upper limit of the hibernation time; or if the hibernation time that is obtained by calculating by the controller according to the first adjustment coefficient or the first adjustment coefficient and the third adjustment coefficient is less than the set lower limit of the hibernation time, the obtained hibernation time is adjusted to be equal to the lower limit of the hibernation time.

The following describes how to adjust a hibernation time according to a preset time period by using a specific example.

In this method embodiment, a time period is preset to 1 minute, and is stored in the controller. A person skilled in the art may understand that the time period may be set to another value as required. For example, the time period is set to 30 seconds. The time period may be recorded by setting a timer in the controller. When the preset time period ends, the controller is triggered to acquire a current sent quantity and a current successfully processed quantity, and adjust a hibernation time. In other words, in this embodiment of the present invention, the controller adjusts the hibernation time every minute.

The following describes a method for adjusting a hibernation time according to a preset time period by using an example.

$t=(t_1+\text{Constant})/r_1 \times \mu_t$ where $t$ is a new hibernation time obtained after adjustment, $t_1$ is a current value of a hibernation time, $r_1$ is a current value of a first adjustment coefficient, and $\mu_t$ is a value of a third adjustment coefficient relative to that of the first adjustment coefficient. $\mu_t$ is inversely proportional to $r$; that is, a larger first adjustment coefficient $r$ indicates a smaller third adjustment coefficient and a smaller first adjustment coefficient $r$ indicates a larger third adjustment coefficient $\mu_t$. $r_1$ is a ratio of a current value of a successfully processed quantity to a current value of a sent quantity: $r_1=(p_1/q_1) \times 100\%$, where $p_1$ is the current value of the successfully processed quantity, and $q_1$ is the current value of the sent quantity.

In this embodiment, the hibernation time is adjusted by using a piecewise function.

A calculation formula is as follows:

$t = t_{MaxDelay}(r_1 < 0.2)$;

$t = (t_1+10)/r_1 \times 1.6(0.2 \leq r_1 < 0.5)$;

$t = (t_1+10)/r_1 \times 1.4(0.5 \leq r_1 < 0.8)$;

$t = (t_1+10)/r_1 \times 1.0(0.8 \leq r_1 < 0.95)$;

$t = (t_1+0)/r_1 \times 0.9(t_1 \geq t_{Threshold}, \text{ and } r_1 \geq 0.95)$; and $t = t_{MinDelay}(t_1 < t_{Threshold}, \text{ and } r_1 \geq 0.95)$.

$t_{MinDelay}$ is hibernation a lower limit of the hibeation time, $t_{MaxDelay}$ is an upper limit of the hibernation time, and the upper limit and the lower limit of the hibernation time are preset. In this embodiment, the lower limit of the hibernation time is set to 0.

Figure 5:
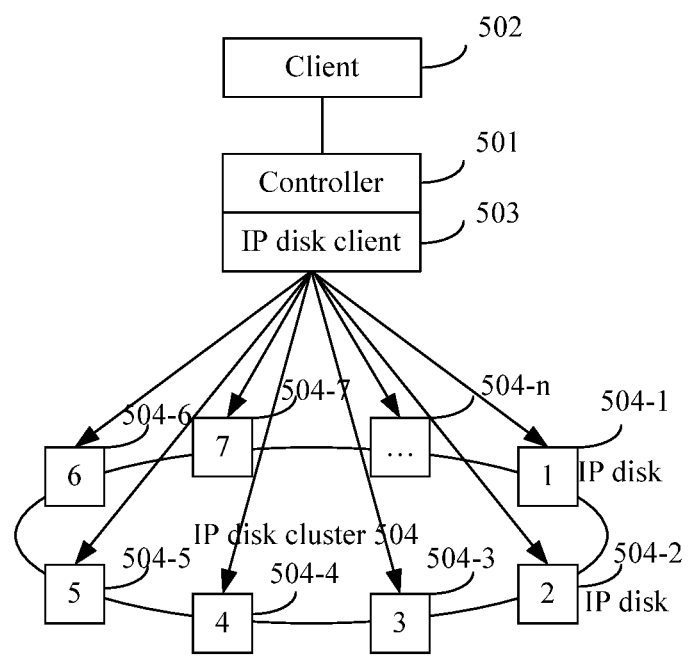
FIG. 5 is another schematic diagram of a system architecture of an object-based storage system.
Figure 6A:
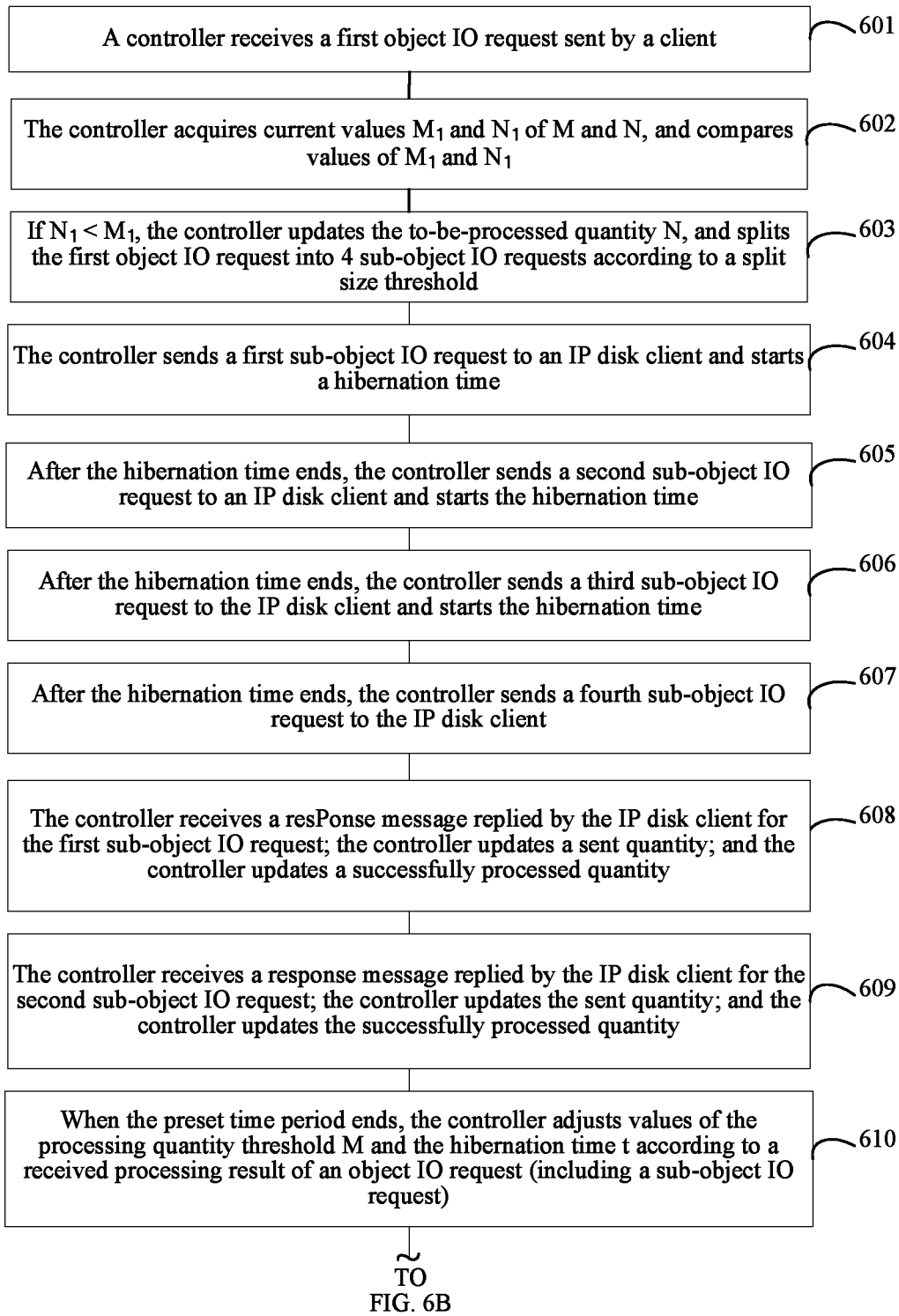
FIG. 6A and FIG. 6B are a procedure of a further service flow control method in an object-based storage system.
Figure 6B:
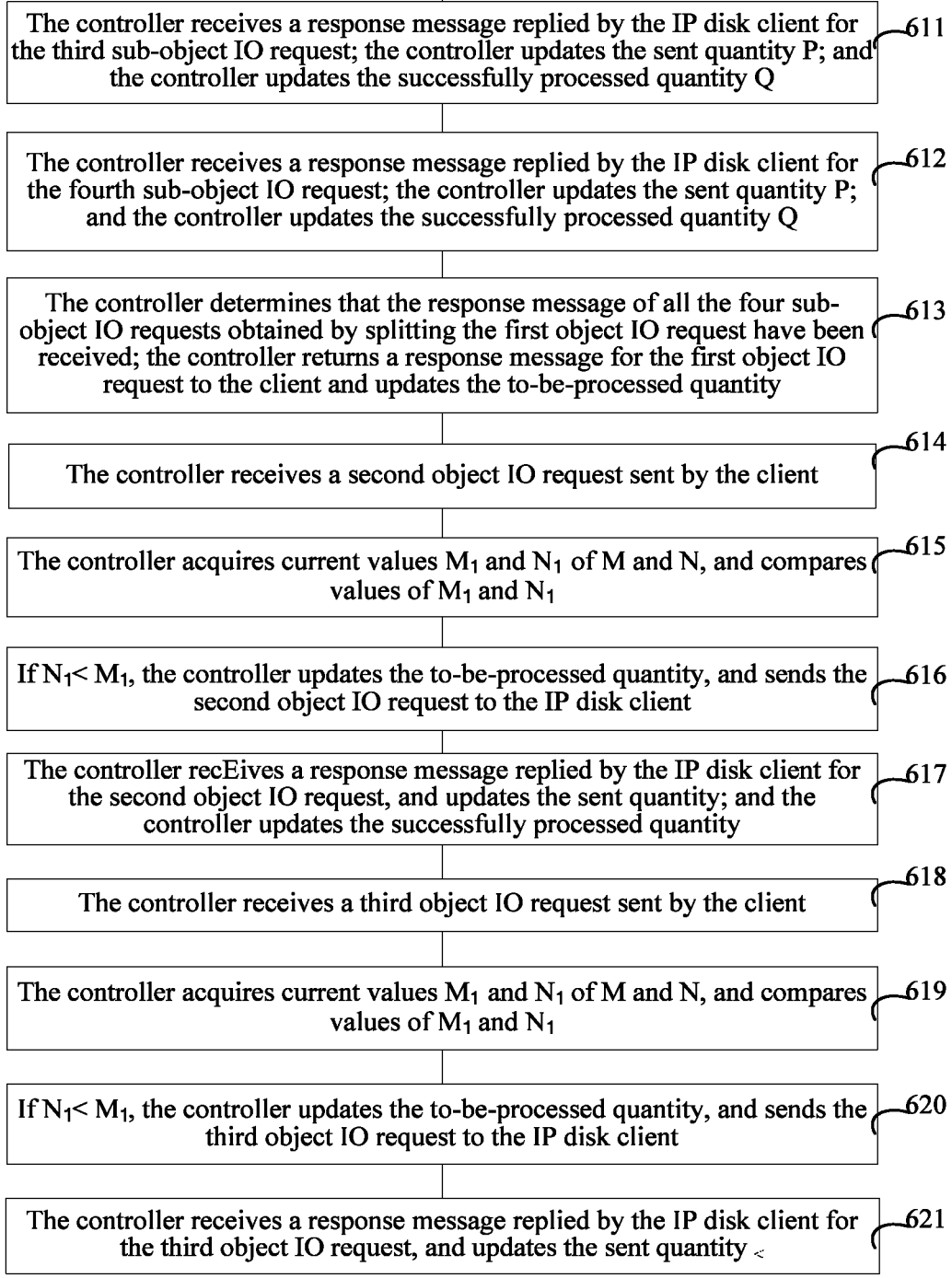

The following exemplarily describes a procedure of a method for implementing service flow control in an object-based storage system by using a specific example. FIG. 5 shows the object-based storage system to which the method process is applicable, and FIG. 6 shows the procedure of the method.

The object-based storage system shown in FIG. 5 includes a controller 501, an IP disk client 503, and an IP disk cluster 504. In other words, a storage device in the object-based storage system shown in FIG. 5 is an IP disk, and a corresponding storage device client is an IP disk client. The controller 501 is connected to the IP disk client 503, and the controller 501 and the IP disk client 503 are deployed on one server, where the server may be an HTTP server. The IP disk client 503 is connected to IP disks in the IP disk cluster 504. The controller 501 is further connected to a client 502, where the client 502 sends an object IO request to the controller 501.

The controller 501 stores a processing quantity threshold M and a to-be-processed quantity N, where the processing quantity threshold M refers to a maximum quantity of object IO requests that can be currently processed by the object-based storage system, and the to-be-processed quantity N is a quantity of to-be-processed object IO requests in the object-based storage system. In this embodiment of the present invention, a current value of M is 2000, and a current value of N is 1500; that is, $M_1=2000$, and $N_1=1500$.

The controller 501 further stores a hibernation time t, where the hibernation time t is a time interval between sending two object IO requests to the IP disk client by the controller 501. In this embodiment of the present invention, a current value of t is 100 milliseconds; that is, $t_1=100$ ms.

The controller 501 further stores a time period T, where the controller updates values of M and t according to the time period. In this embodiment of the present invention, T is 30 seconds.

The controller 501 further stores a sent quantity P and a successfully processed quantity Q. The sent quantity P refers to a quantity of object IO requests that are sent by the controller 501 to the IP disk client; and the successfully processed quantity Q refers to a quantity of object IO requests successfully processed among the object IO requests that are sent by the controller 501 to the IP disk client. In this embodiment of the present invention, a current value of P is 2800, and a current value of Q is 2400; that is, $P_1=2800$, and $Q_1=2400$.

The controller 501 further stores a split size threshold of an object IO request. In this embodiment of the present invention, the split size threshold is 1 M.

The controller further stores adjustment formulas of the processing quantity threshold M and the hibernation time t. An adjustment formula of the processing quantity threshold M is as follows:

$M=M_{Min}(r_1<0.2);$ $M=M_1 \times r_1 \times 0.6 (0.2 \le r_1 <0.6);$ $M=M_1 \times r_1 \times 0.8 (0.6 \le r_1 <0.8);$ $M=M_1 \times r_1 \times 1.0 (0.8 \le r_1 <0.95);$ $M=M_1 \times r_1 \times 1.1 (M_1<M_{Max}, \text{ and } r_1 \ge 0.95);$ and $M=M_{Max}(M_1=M_{Max}, \text{ and } r_1 \ge 0.95).$ $M_{Min}=200, M_{Max}=3000,$ and $r_1=(Q_1/P_1) \times 100\%.$ An adjustment formula of the hibernation time t is as follows:

$t=t_{MaxDelay}(r_1<0.2);$ $t=(t_1+15)/r_1 \times 1.6 (0.2 \le r_1 <0.6);$ $t=(t_1+15)/r_1 \times 1.4 (0.6 \le r_1 <0.8);$ $t=(t_1+15)/r_1 \times 1.0 (0.8 \le r_1 <0.95);$ $t=(t_1+0)/r_1 \times 0.9 (t_1 \ge t_{Threshold}, \text{ and } r_1 \ge 0.95);$ and $t=t_{MinDelay}(t_1<t_{Threshold}, \text{ and } r_1 \ge 0.95).$ $t_{MinDelay}=0, t_{MaxDelay}=200,$ and $r_1=(Q_1/P_1) \times 100\%.$ The procedure of the method for implementing service flow control in the object-based storage system is as follows:

Step 601: The controller 501 receives a first object IO request sent by the client 502, where a size of the first object IO request is 3.5 M.

Step 602: The controller 501 acquires current values of M and N ($M_1=2000$, and $N_1=1500$), and compares values of $M_1$ and $N_1$.

Step 603: If $N_1<M_1$, the controller 501 updates the to-be-processed quantity N, and splits the first object IO request according to the split size threshold (1 M). The current value $N_1$ of the to-be-processed quantity N is updated to 1501, and the first object IO request is split into four sub-object IO requests, which respectively are a first sub-object IO request (1 M), a second sub-object IO request (1 M), a third sub-object IO request (1 M), and a fourth sub-object IO request (0.5 M), where the four sub-object IO requests carry a same identifier.

If a comparison result is $N_1>M_1$, the controller 501 replies with a system busy response message to the client 502 that sends the first object IO request. In this case, the controller 501 does not update the to-be-processed quantity N, and discards the first object IO request.

Step 604: The controller 501 sends a first sub-object IO request to the IP disk client 503, and starts a hibernation time. After receiving the first sub-object IO request, the IP disk client 503 sends, according to a preset Key-Value algorithm, the first sub-object IO request to an IP disk 504-3 for processing. After processing the first sub-object IO request, the IP disk 504-3 replies with a response message for the first sub-object IO request to the IP disk client 503, where the response message carries a processing result indicating that the first sub-object IO request is successfully processed. The IP disk client 503 replies with the received response message to the controller 501.

Step 605: After the hibernation time ends, that is, 100 milliseconds after the controller 501 sends the first sub-object IO request to the IP disk client 503, the controller 501 sends the second sub-object IO request to the IP disk client 503, and starts the hibernation time. Similarly, after receiving the second sub-object IO request, the IP disk client 503 sends, according to the preset Key-Value algorithm, the second sub-object IO request to an IP disk 504-2 for processing. The IP disk client 503 determines a specific IP disk according to information such as metadata in a sub-object IO request and according to the Key-Value algorithm. The four sub-object IO requests obtained by splitting the first object IO request may be sent to a same IP disk for processing, or may be sent to different IP disks for processing.

Step 606: After the hibernation time ends, the controller 501 sends the third sub-object IO request to the IP disk client 503, and starts the hibernation time. A method used by the IP disk client 503 to process the third sub-object IO request is the same as that described above, and is not described herein again.

Step 607: After the hibernation time ends, the controller 501 sends the fourth sub-object IO request to the IP disk client 503. A method used by the IP disk client 503 to process the fourth sub-object IO request is the same as that described above, and is not described herein again.

Step 608: The controller 501 receives a response message replied by the IP disk client 503 for the first sub-object IO request; the controller 501 updates the sent quantity P, where the current value $P_1$ of the sent quantity is updated to 2801; if the response message carries a processing result indicating that the first sub-object IO request is successfully processed, the controller 501 updates the successfully processed quantity Q, where the current value $Q_1$ of the successfully processed quantity Q is updated to 2401.

There is no strict time sequence between step 608 and step 605 to step 607; step 608 needs to be performed after step 604.

Step 609: The controller 501 receives a response message replied by the IP disk client 503 for the second sub-object IO request; the controller 501 updates the sent quantity P, where the current value $P_1$ of the sent quantity is updated to 2802; if the response message carries a processing result indicating that the second sub-object IO request is successfully processed, the controller 501 updates the successfully processed quantity Q, where the current value $Q_1$ of the successfully processed quantity Q is updated to 2402.

There is no strict time sequence between step 609 and step 606 to step 608; step 609 only needs to be performed after step 605.

Step 610: When the preset time period ends, the controller 501 adjusts values of the processing quantity threshold M and the hibernation time t according to a received processing result of an object IO request (including a sub-object IO request).

The controller 501 acquires the current value of the sent quantity P and the current value of the successfully processed quantity Q, and calculates a current success rate.

Therefore, $r_1=(Q_1/P_1)\times 100\%=(2402/2802)\times 100\%=0.86$;

$M=M_1\times r_1\times 1.0=2000\times 0.86\times 1.0=1720$; and $t=(t_1+15)/r_1\times 1.0=(100+15)/0.86\times 1.0=134$.

After the processing quantity threshold M and the hibernation time t are adjusted, current values of the processing quantity threshold M and the hibernation time t that are obtained again by the controller 501 are values after the adjustment. Therefore, $M_1=1720$, and $t_1=134$ ms.

There is no strict time sequence between step 610 and other steps, provided that when the preset time period ends, the controller 501 acquires the current value of the sent quantity P and the current value of the successfully processed quantity Q according to the acquired processing result of the object IO request (including the sub-object IO request), and performs corresponding calculation and adjustment.

Step 611: The controller 501 receives a response message replied by the IP disk client 503 for the third sub-object IO request; the controller 501 updates the sent quantity P, where the current value $P_1$ of the sent quantity is updated to 2803; if the response message carries a processing result indicating that the third sub-object IO request is successfully processed, and the controller 501 updates the successfully processed quantity Q, where the current value $Q_1$ of the successfully processed quantity Q is updated to 2403.

Similarly, step 611 only needs to be performed after step 606, and there is no strict time sequence between step 611 and step 607 to step 610.

Step 612: The controller 501 receives a response message replied by the IP disk client 503 for the fourth sub-object IO request; the controller 501 updates the sent quantity P, where the current value $P_1$ of the sent quantity is updated to 2804; if the response message carries a processing result indicating that the fourth sub-object IO request is successfully processed, the controller 501 updates the successfully processed quantity Q, where the current value $Q_1$ of the successfully processed quantity Q is updated to 2404.

Similarly, step 612 only needs to be performed after step 607, and there is no strict time sequence between step 612 and step 608 to step 611.

Step 613: The controller 501 determines that the response messages of all the four sub-object IO requests obtained by splitting the first object IO request have been received, and all the response messages carry the processing results indicating a processing success; the controller 501 replies with a response message for the first object IO request to the client 502, where the response message for the first object IO request carries information indicating a processing success; and the controller 501 updates the to-be-processed quantity N, where the current value $N_1$ of the to-be-processed quantity N is updated to 1500.

If a response message for one sub-object IO request among the response messages for the sub-object IO requests of the first object IO request that are received by the controller 501 carries information indicating a processing failure, the controller 501 replies with a response message indicating a processing failure to the client 502. In this case, the controller 501 also needs to update the to-be-processed quantity N, where the current value $N_1$ of the to-be-processed quantity N is updated to 1500.

In other words, the to-be-processed quantity N needs to be updated provided that the controller 501 replies with a response message for an object IO request to the client 502, regardless of whether the object IO request is processed successfully or unsuccessfully, where 1 is subtracted from the current value $N_1$ of the to-be-processed quantity N. Certainly, before the controller 501 replies with a response message indicating a processing failure to the client 502, the controller may further send the object IO request to the IP disk client 503 for processing for a specific quantity of times.

When a final result carried in a replied response message for any sub-object IO request obtained by splitting the first object IO request is information indicating a processing failure, in addition to replying with a response message indicating a processing failure to the client 502, the controller further needs to delete information about the multiple sub-object IO requests obtained by splitting the first object IO request, and instruct the IP disk client 503 and the IP disk cluster 504 not to perform subsequent processing. A specific processing manner is the same as that in the prior art, and is not described in detail herein again.

Step 614: The controller 501 receives a second object IO request sent by the client 502, where a size of the second object IO request is 0.8 M.

Step 615: The controller 501 acquires current values of M and N ($M_1=1720$, and $N_1=1500$), and compares values of $M_1$ and $N_1$.

Step 616: If $N_1<M_1$, the controller 501 updates the to-be-processed quantity N, and sends the second object IO request to the IP disk client 503. The current value $N_1$ of the to-be-processed quantity N is updated to 1501. Because the second object IO request is less than the split size threshold, in this case, the controller 501 does not split the second object IO request, and sends the second object IO request to the IP disk client 503.

Step 617: The controller 501 receives a response message replied by the IP disk client 503 for the second object IO request; the controller 501 updates the sent quantity P, where the current value $P_1$ of the sent quantity is updated to 2805; if the response message carries a processing result indicating that the second object IO request is successfully processed, the controller 501 updates the successfully processed quantity Q, where the current value $Q_1$ of the successfully processed quantity Q is updated to 2405.

Step 618: The controller 501 receives a third object IO request sent by the client 502, where a size of the third object IO request is 0.7 M.

There is no strict sequence between step 618 and step 617.

Step 619: The controller 501 acquires current values of M and N ($M_1=1720$, and $N_1=1501$), and compares values of $M_1$ and $N_1$.

Step 620: If $N_1<M_1$, the controller 501 updates the to-be-processed quantity N, and sends the third object IO request to the IP disk client 503. The current value $N_1$ of the to-be-processed quantity N is updated to 1502. Because the third object IO request is less than the split size threshold, in this case, the controller 501 does not split the third object IO request, and sends the third object IO request to the IP disk client 503.

Step 621: The controller 501 receives a response message replied by the IP disk client 503 for the third object IO request; the controller 501 updates the sent quantity P, where the current value $P_1$ of the sent quantity is updated to 2806; if the response message carries a processing result indicating that the third object IO request is unsuccessfully processed, the controller 501 does not update the successfully processed quantity Q, where the current value $Q_1$ of the successfully processed quantity Q remains unchanged, that is, $Q_1=2405$.

By analogy, when a next time period ends, the controller 501 acquires a current value of the sent quantity P and a current value of the successfully processed quantity Q, calculates a current success rate, and then adjusts the processing quantity threshold M and the hibernation time t according to the current success rate.

It should be noted that there is no strict requirement on a time sequence between some steps described above. The procedure of the method in this embodiment of the present invention is only described exemplarily, and is not intended to limit the present invention. For example, before the controller 501 sends the third sub-object IO request to the IP disk client 503, the controller 501 has received the response message for the first sub-object IO request. For another example, the preset time period ends before the controller 501 sends the fourth sub-object IO request to the IP disk client 503. In this case, the controller 501 adjusts M and t according to current values of parameters. It is also possible that the time period ends after the controller 501 receives the second object IO request and the third object IO request, and then the controller 501 adjusts M and t according to current values of parameters.

By using the method provided by this embodiment of the present invention, a controller periodically adjusts a processing quantity threshold and a hibernation time according to a processing result of an object IO request, to adjust a quantity of object IO requests sent to a storage device client and a storage device for processing, and a time interval. This can ensure that the quantity of object IO requests sent to the storage device for processing does not exceed a processing capability of the storage device, to avoid congestion caused on the storage device, thereby improving processing performance of an object-based storage system and reducing a delay.

Figure 7:
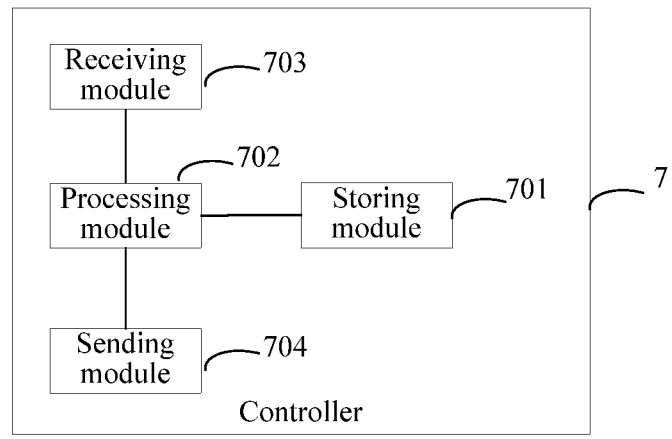
FIG. 7 is a schematic structural diagram of a controller for implementing service flow control in an object-based storage system.

An embodiment of the present invention further provides a controller for implementing the foregoing methods. FIG. 7 shows a specific structure of the controller.

As shown in FIG. 7, the controller includes a storing module 701, a processing module 702, a receiving module 703, and a sending module 704.

The receiving module 703 is configured to receive an object IO request that is sent by a user by using a client, and reply with a response message for the received object IO request to the client, where the response message carries a processing result indicating that the object IO request is processed successfully or unsuccessfully. The receiving module 703 is further configured to: after receiving a command of the processing module 702, reply with a system busy response message or a reject response message to the client.

The sending module 704 is configured to send the object IO request to a storage device client, and receive a response message replied by the storage device client for the object IO request, where the response message carries a processing result of the object IO request, including a processing result indicating a processing success or a processing result indicating a processing failure.

The storing module 701 is configured to store information required by the controller, including:

a processing quantity threshold, which is a current maximum quantity of object IO requests that can be processed by the object-based storage system;

a to-be-processed quantity, which is a current quantity of to-be-processed object IO requests in the object-based storage system;

a hibernation time, which is a current time interval between sending two object IO requests (including a sub-object IO request) by the controller to the storage device client;

a time period, which is a time period for the controller to update the processing quantity threshold and the hibernation time;

a sent quantity, which is a quantity of object IO requests (including a sub-object IO request) that has been sent by the controller to the storage device client;

a successfully processed quantity, which is a quantity of object IO requests (including a sub-object IO request) among object IO requests (including sub-object IO requests) sent by the controller to the storage device client, of which processing results indicate a processing success;

a split size threshold, which is a size of an object IO request that can be processed by the object-based storage system;

an adjustment formula of the processing quantity threshold, which is used to adjust the processing quantity threshold when a preset condition is met; and an adjustment formula of the hibernation time, which is used to adjust the hibernation time when a preset condition is met.

The foregoing information may be selected according to a service requirement, and is not necessarily selected in full. For example, in a case in which before sending a large object IO request (an object IO request whose size is greater than the split size threshold) to the controller, the client splits the object IO request, the split size threshold is stored in the client, and the storing module of the controller does not need to store information about the split size threshold. In addition, if the processing quantity threshold or the hibernation time is updated after a specific quantity of object IO requests is sent to the storage device client, the storing module does not need to store information about the time period. Certainly, the user may also store other information in the storing module 701 as required, which is not described herein again by using examples.

The processing module 702 is configured to execute related processing such as determining, calculation, and comparison. For example, the processing module 702 is configured to implement the following actions:

The processing module 702 obtains an object IO request from the receiving module 703.

The processing module 702 acquires required data information from the storing module 701.

The processing module 702 compares a current value of the processing quantity threshold and a current value of the to-be-processed quantity that are acquired from the storing module, and determines a size relationship between them. When the current value of the to-be-processed quantity is less than the current value of the processing quantity threshold, the processing module 702 updates the current value of the to-be-processed quantity, and performs corresponding processing on the object IO request, and when the current value of the to-be-processed quantity is greater than or equal to the current value of the processing quantity threshold, the processing module 702 replies with a reject response message or a system busy response message to the client by using the receiving module 703.

When a size of the object IO request is greater than the acquired split size threshold, the processing module 702 splits the object IO request into multiple sub-object IO requests according to the split size threshold, where each of the multiple sub-object IO requests obtained by splitting has a size not greater than the split size threshold and carries a same identifier.

The object IO request is sent to the storage device client by using the sending module 704. The processing module 702 may further start a hibernation time after sending one object IO request to the storage device client, and send a next object IO request to the storage device client after the hibernation time ends. Alternatively, the processing module 702 starts a hibernation time only for the sub-object IO requests obtained by splitting, that is, starts a hibernation time after sending one sub-object IO request, and sends a next sub-object IO request to the storage device client after the hibernation time ends.

The processing module 702 is further configured to obtain, from the sending module 704, a response message replied by the storage device client for the object IO request, and reply with the response message for the object IO request to the client by using the receiving module 703. After splitting one object IO request into multiple sub-object IO requests, and after obtaining response messages of all the sub-object IO requests of the object IO request, the processing module 702 replies with a response message for the object IO request to the client according to processing results carried in the response messages for all the sub-object IO requests. If the response messages for all the sub-object IO requests of the object IO request carry processing results indicating a processing success, the processing module 702 replies with, to the client, a response message indicating that the object IO request is successfully processed; otherwise, the processing module 702 replies with, to the client, a response message indicating that the object IO request is processed unsuccessfully.

The processing module 702 is further configured to update values of the sent quantity and the successfully processed quantity. The sent quantity may be updated after the processing module 702 sends, by using the sending module 704, the object IO request or the sub-object IO requests to the storage device client, or may be updated after the response message or the response messages for the object IO request or the sub-object IO requests are obtained by using the sending module 704. The successfully processed quantity is updated when the processing module 702 obtains, by using the sending module 704, the response message or the response messages for the object IO request or the sub-object IO requests and the response message or the response messages carry a processing result indicating a processing success. Detailed descriptions and examples have been given in the foregoing for specific updating methods, which are not described herein again.

The processing module 702 is further configured to determine whether a preset time period ends, and when the preset time period ends, adjust the processing quantity threshold and the hibernation time.

The processing module 702 is further configured to adjust the processing quantity threshold and/or the hibernation time according to a stored formula. Detailed descriptions and examples have been given in the foregoing for specific adjustment methods, which are not described herein again.

When a quantity of object IO requests sent to a storage device increases and performance reduces, the controller may adjust a value of the processing quantity threshold and/or the hibernation time according to a received response message for an object IO request by using a specific algorithm. When a quantity of to-be-processed object IO requests in the object-based storage system is equal to or greater than the processing quantity threshold, the controller directly replies with a reject response message or a busy response message to a requesting party, and discards the received object IO request.

By using a stored processing quantity threshold, a controller may control a quantity of object IO requests that are sent by using a storage device client to a storage device for processing. This ensures that the quantity of object IO requests sent to the storage device does not exceed a capability of the storage device, so that all processing resources and cache resources of the storage device are used to effectively process the object IO requests, thereby improving performance and a success rate of an entire object-based storage system for processing an object IO request. The controller may further adjust, by using a stored hibernation time, a time interval for sending an object IO request or a sub-object IO request to the storage device by using the storage device client, so that the storage device has sufficient time to process an object IO request in a queue, thereby improving performance and a success rate of the object-based storage system for processing an object IO request.

The controller provided by this embodiment of the present invention is configured to implement service flow control in the object-based storage system, and includes the storing module 701, the processing module 702, the receiving module 703, and the sending module 704.

Specifically, the receiving module 703 is configured to receive a first object IO request, and send the first object IO request to the processing module 702.

After receiving the first object IO request, the processing module 702 acquires a processing quantity threshold and a to-be-processed quantity from the storing module 701, where the processing quantity threshold is a threshold of a quantity of object IO requests that can be processed by the object-based storage system, and the to-be-processed quantity is a quantity of to-be-processed object IO requests in the object-based storage system.

If the to-be-processed quantity is less than the processing quantity threshold, the processing module 702 is further configured to send the first object IO request to the sending module 704, and update the to-be-processed quantity in the storing module 701.

The sending module 704 is configured to send the first object IO request to a storage device client; receive a first response message replied by the storage device client for the first object IO request, where the first response message carries a processing result of the first object IO request; and send the first response message to the processing module 702.

The processing module 702 is further configured to adjust the processing quantity threshold in the storing module 701 according to a received processing result of an object IO request when a preset condition is met.

If the to-be-processed quantity is greater than or equal to the processing quantity threshold, the processing module 702 is further configured to reply with a reject response message or a busy response message to a requesting party of the first object IO request.

The processing module 702 is further configured to start a hibernation time after sending the first object IO request to the sending module 704, and send a second object IO request to the sending module 704 after the hibernation time ends.

The processing module 702 is further configured to: after receiving the first response message, update a sent quantity in the storing module 701, where the sent quantity is a quantity of object IO requests that are sent by the controller to the storage device client; and if the processing result carried in the first response message indicates a processing success, update a successfully processed quantity in the storing module 701, where the successfully processed quantity is a quantity of received object IO requests that are successfully processed by the storage device client.

The processing module 702 is further configured to: when the first object IO request is greater than a split size threshold, split the first object IO request into multiple sub-object IO requests, where a size of each sub-object IO request is not greater than the split size threshold and carries a same identifier, and the split size threshold is a size threshold of an object IO request that can be processed by the object-based storage system; send a first sub-object IO request obtained by splitting to the storage device client by using the sending module 704; and start a hibernation time, and send a second sub-object IO request by using the sending module 704 after the hibernation time ends.

The sending module 704 receives a response message replied by the storage device client for the first sub-object IO request, where the response message carries a processing result of the first sub-object IO request; and send the response message to the processing module 702. The processing module 702 is further configured to receive the processing result of the first sub-object IO request, and update a sent quantity, where the sent quantity is a quantity of object IO requests that are sent to the storage device client; and if the processing result indicates a processing success, the processing module 702 is further configured to update a successfully processed quantity, where the successfully processed quantity is a quantity of received object IO requests that are successfully processed by the storage device client.

That the processing module 702 adjusts the processing quantity threshold in the storing module 701 according to a received processing result of an object IO request when the preset condition is met is specifically that: the processing module 702 periodically acquires a current value of the sent quantity and a current value of the successfully processed quantity according to a preset time period; calculates a processing success rate of an object IO request according to the current value of the sent quantity and the current value of the successfully processed quantity; and adjusts the processing quantity threshold by using the processing success rate as a first adjustment coefficient.

The processing module 702 is further configured to adjust, according to a second adjustment coefficient, a processing quantity threshold that is obtained after adjustment is performed according to the first adjustment coefficient, where a value of the second adjustment coefficient is proportional to that of the first adjustment coefficient.

The storing module 701 further stores an upper limit and a lower limit of the processing quantity threshold.

The processing module 702 is further configured to modify, according to the upper limit or the lower limit of the processing quantity threshold, a processing quantity threshold that is obtained after adjustment, so that a value of the processing quantity threshold that is obtained after adjustment is between the upper limit and the lower limit of the processing quantity threshold.

The processing module 702 is further configured to periodically acquire a current value of the sent quantity and a current value of the successfully processed quantity according to a preset time period; calculate a processing success rate of an object IO request according to the current value of the sent quantity and the current value of the successfully processed quantity; and adjust the hibernation time by using the processing success rate as a first adjustment coefficient.

The processing module 702 is further configured to adjust the hibernation time according to a third adjustment coefficient and the first adjustment coefficient, where a value of the third adjustment coefficient is inversely proportional to that of the first adjustment coefficient.

The storing module 701 further stores an upper limit and a lower limit of the hibernation time.

The processing module 702 is further configured to modify, according to the upper limit or the lower limit of the hibernation time, a hibernation time that is obtained after adjustment, so that a value of the hibernation time that is obtained after adjustment is between the upper limit and the lower limit of the hibernation time.

The processing module 702 is further configured to reply with, by using the receiving module 703, a response message to a requesting party that sends an object IO request, where the response message carries a final processing result of the object IO request; and update the to-be-processed quantity.

An embodiment of the present invention further provides another specific function of a controller, where the controller includes a storing module 701, a processing module 702, a receiving module 703, and a sending module 704.

The receiving module 703 is configured to receive a first object IO request, and send the first object IO request to the processing module 702.

The processing module 702 is configured to: after receiving the first object IO request, acquire a split size threshold from the storing module 701, where the split size threshold is a size of an object IO request that can be processed by the object-based storage system.

The processing module 702 is further configured to: when a size of the first object IO request is greater than the split size threshold, split the second object IO request into multiple sub-object IO requests, where a size of each sub-object IO request is not greater than the split size threshold and carries a same identifier; and send a first sub-object IO request to the sending module 704, and start a hibernation time.

The sending module 704 is further configured to send the first sub-object IO request to a storage device client connected to the controller; receive a response message replied by the storage device client for the first sub-object IO request, where the response message carries a processing result of the first sub-object IO request; and send the response message for the first sub-object IO request to the processing module 702.

The processing module 702 is further configured to adjust the hibernation time according to a received processing result of an object IO request when a preset condition is met.

The processing module 702 is further configured to; after the hibernation time is started, send a second sub-object IO request to the storage device client by using the sending module after the hibernation time ends; and return to execute a step of starting the hibernation time, until the multiple sub-object IO requests are sent to the storage device client.

The processing module 702 is further configured to: after receiving the response message for the first sub-object IO request, update a sent quantity, where the sent quantity is a quantity of object IO requests that are sent by the processing module 702 to the storage device client by using the sending module 704; and if the processing result of the first object IO request that is carried in the response message for the first sub-object IO request indicates a processing success, the processing module 702 is further configured to update a successfully processed quantity, where the successfully processed quantity is a quantity of received object IO requests that are successfully processed by the storage device client; or if the processing result of the first object IO request that is carried in the response message for the first sub-object IO request indicates a final processing failure, retain a successfully processed quantity unchanged.

That the processing module 702 is further configured to adjust the hibernation time according to a received processing result of an object IO request when a preset condition is met is specifically that: the processing module 702 periodically acquires a current value of the sent quantity and a current value of the successfully processed quantity according to a preset time period; calculates a processing success rate of an object IO request according to the current value of the sent quantity and the current value of the successfully processed quantity; and adjusts the hibernation time by using the processing success rate as a first adjustment coefficient.

The processing module 702 is further configured to adjust, according to a third adjustment coefficient, a hibernation time that is obtained after adjustment is performed according to the first adjustment coefficient, where a value of the third adjustment coefficient is inversely proportional to that of the first adjustment coefficient.

The storing module 701 further stores an upper limit and a lower limit of the hibernation time.

The processing module 702 is further configured to modify, according to the upper limit or the lower limit of the hibernation time, a hibernation time that is obtained after adjustment, so that a value of the hibernation time that is obtained after adjustment is between the upper limit and the lower limit of the hibernation time.

A procedure of a method used by the controller to process an object IO request is similar to the procedure described above, details are shown in FIG. 2-1, FIG. 2-2, FIG. 2-3, FIG. 3, FIG. 4, and the corresponding text descriptions, which are not described again in detail in this embodiment.

The controller may also be deemed as a device including a CPU and a memory. The memory stores a program, and the CPU executes the foregoing service flow control method by using the program in the memory. The controller may further include an interface, where the interface is configured to connect to a storage device client, and a function of the interface may be, for example, sending an object IO request generated by processing by the CPU to the storage device client. The interface may also be connected to another client outside the object-based storage system, and is configured to receive various object IO requests sent by the client.

Figure 8:
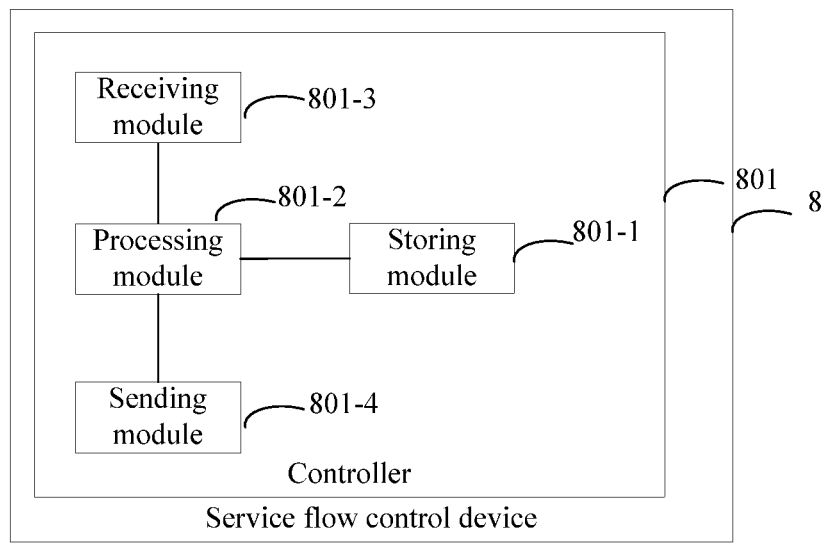
FIG. 8 is a schematic structural diagram of a service flow control device for implementing service flow control in an object-based storage system.

An embodiment of the present invention further provides a service flow control device 8 for implementing service flow control in an object-based storage system, as shown in FIG. 8. The device 8 includes a controller 801, and the controller 801 includes a receiving module 801-3, a storing module 801-1, a processing module 801-2, and a sending module 801-4. The controller is configured to implement the service flow control method described above, and the controller 801 has a same structure and function as the controller in FIG. 7 and the corresponding text descriptions, which are not described herein again.

Figure 9:
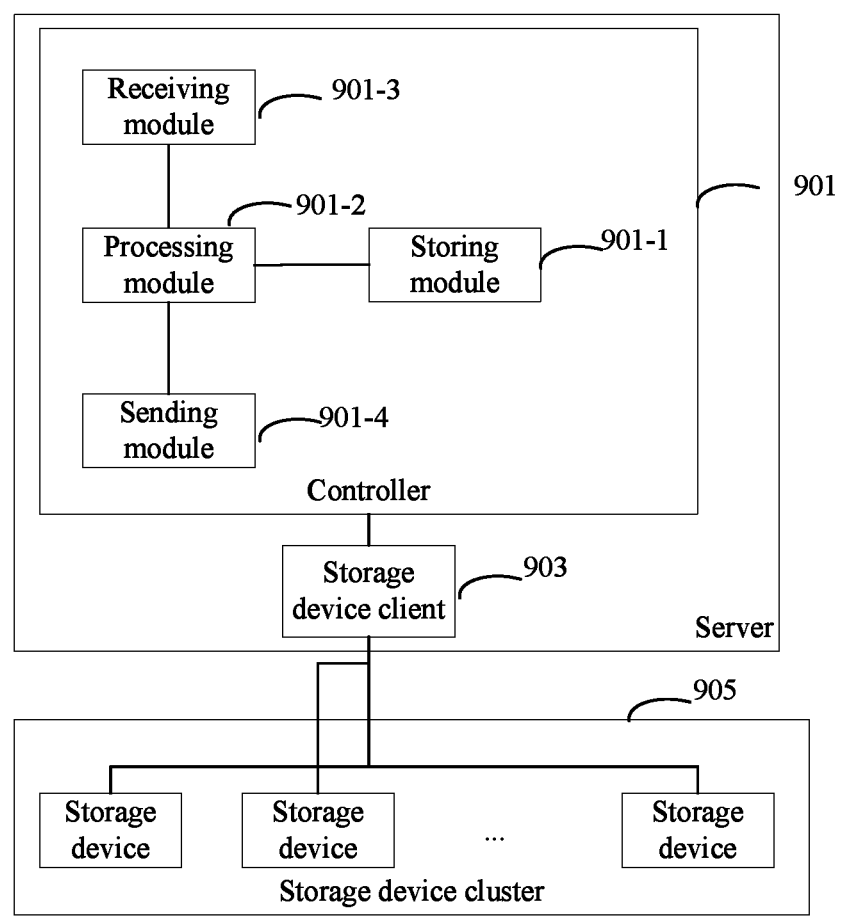
FIG. 9 is a schematic diagram of an object-based storage system that can implement service flow control.

An embodiment of the present invention further provides an object-based storage system for implementing service flow control, as shown in FIG. 9. The object-based storage system includes a controller 901, a storage device client 903, and at least two storage devices 905. The controller 901 is connected to the storage device client 903, and the storage device client 903 is connected to the at least two storage devices 905. The controller 901 and the storage device client 903 may be located on a same server. The controller 901 includes a receiving module 901-3, a storing module 901-1, a processing module 901-2, and a sending module 901-4. The controller is configured to implement the service flow control method described above, and the controller 901 has a same structure and function as the controller in FIG. 7 and the corresponding text descriptions, which are not described herein again.

Based on the foregoing descriptions of the implementation manners, it may be clearly understood that the present invention may be implemented by software in addition to necessary universal hardware or certainly, by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

In the embodiments of the present invention, a processing quantity threshold of an object IO request that can be processed by an object-based storage system is set in a controller, and according to a received processing result of an object IO, the processing quantity threshold is dynamically adjusted according to a specific rule by using a preset algorithm. In this way, the controller may control a quantity of object IO requests that are sent to the storage device by using a storage device client, so that the quantity of object IO requests received by the storage device does not exceed a processing capability of the storage device. Therefore, all resources of the storage device may be used to effectively process the object IO requests, which ensures a processing success rate of the object IO request and improves processing performance of the object-based storage system. In addition, a time interval, that is, a hibernation time, between sending two object IO requests (or sub-object IO requests) is also set in the controller. The controller may more accurately control, by adjusting the quantity of object IO requests that are sent to the storage device by using the storage device client, the quantity of object IO requests sent to the storage device, which ensures that all resources of the storage device may be used to effectively process the object IO requests, and improves processing performance of the object-based storage system.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A service flow control method in an object-based storage system comprising a controller and a storage device client, the method comprising:
   receiving, by the controller, a first object IO request;
   acquiring, by the controller a processing quantity threshold and a to-be-processed quantity, wherein the processing quantity threshold is a threshold of a quantity of object IO requests to be processed by the object-based storage system, and the to-be-processed quantity is a quantity of to-be-processed object IO requests in the object-based storage system;
   when the to-be-processed quantity is less than the processing quantity threshold, sending, by the controller, the first object IO request to the storage device client, and updating the to-be-processed quantity;
   receiving, by the controller, a first response message from the storage device client in response to the first object IO request, wherein the first response message carries a processing result of the first object IO request; and
   adjusting the processing quantity threshold according to a received processing result of an object IO request when a preset condition is met.

2. The method according to claim 1, further comprising:
   when the controller receives a second object IO request, acquiring a current value of the processing quantity threshold and a current value of the to-be-processed quantity; and
   when the current value of the to-be-processed quantity is greater than or equal to the current value of the processing quantity threshold, replying with a reject response message or a busy response message.

3. The method according to claim 1, further comprising:
   starting a hibernation time period after sending the first object IO request to the storage device client;
   when the controller receives a third object IO request, acquiring a current value of the processing quantity threshold and a current value of the to-be-processed quantity; and
   when the current value of the to-be-processed quantity is less than the current value of the processing quantity threshold, sending the third object IO request to the storage device client after the hibernation time period ends, and updating the to-be-processed quantity.

4. The method according to claim 1, further comprising:
   after the receiving a first response message from the storage device client in response to the first object IO request, updating a sent quantity, wherein the sent quantity is a quantity of object IO requests that are sent by the controller to the storage device client;
   when the processing result carried in the first response message indicates a processing success, updating a successfully processed quantity, wherein the successfully processed quantity is a quantity of received object IO requests that are successfully processed by the storage device client; and
   when the processing result carried in the first response message indicates a processing failure, retaining a successfully processed quantity unchanged.

5. The method according to claim 1, wherein the sending the first object IO request to the storage device client comprises:
   acquiring a split size threshold, wherein the split size threshold is a size threshold of an object IO request to be processed by the object-based storage system; and
   when a size of the first object IO request is greater than the split size threshold, splitting, by the controller, the first object IO request into multiple sub-object IO requests, wherein a size of each sub-object IO request is not greater than the split size threshold and carries a same identifier; sending, by the controller, one of the multiple sub-object IO requests to the storage device client;
   starting a hibernation time period;
   sending a subsequent one of the multiple sub-object IO requests to the storage device client after the hibernation time period ends; and
   repeating operations of the starting the hibernation time period and the sending the subsequent one of the multiple sub-object IO requests, until the multiple sub-object IO requests are sent to the storage device client.

6. The method according to claim 5, further comprising:
   receiving a response message from the storage device client after each of the multiple sub-object IO requests was sent, wherein the response message carries a processing result of the each of the multiple sub-object IO requests;
   updating a sent quantity, wherein the sent quantity is a quantity of object IO requests that are sent by the controller to the storage device client;
   when the processing result indicates a processing success, updating a successfully processed quantity, wherein the successfully processed quantity is a quantity of received object IO requests that are successfully processed by the storage device client; and
   when the processing result indicates a final processing failure, retaining a successfully processed quantity unchanged.

7. The method according to claim 4, wherein the adjusting the processing quantity threshold according to the received processing result of the object IO request comprises:

periodically acquiring, by the controller, a current value of the sent quantity and a current value of the successfully processed quantity according to a preset time period;

calculating a processing success rate of an object IO request according to the current value of the sent quantity and the current value of the successfully processed quantity; and adjusting the processing quantity threshold by using the processing success rate as a first adjustment coefficient.

8. The method according to claim 7, further comprising:

adjusting, according to a second adjustment coefficient, a processing quantity threshold that is obtained after the adjusting of the processing quantity threshold is performed according to the first adjustment coefficient, wherein a value of the second adjustment coefficient is proportional to that of the first adjustment coefficient.

9. The method according to claim 7, further comprising:

setting, by the controller, an upper limit and a lower limit of the processing quantity threshold; and modifying, according to the upper limit or the lower limit of the processing quantity threshold, the adjusted processing quantity threshold, so that a value of the adjusted processing quantity threshold is between the upper limit and the lower limit of the processing quantity threshold.

10. The method according to claim 4, further comprising:

periodically acquiring, by the controller, a current value of the sent quantity and a current value of the successfully processed quantity according to a preset time period;

calculating a processing success rate of an object IO request according to the current value of the sent quantity and the current value of the successfully processed quantity; and adjusting a hibernation time by using the processing success rate as a first adjustment coefficient.

11. The method according to claim 10, further comprising:

adjusting the hibernation time according to a third adjustment coefficient and the first adjustment coefficient, wherein a value of the third adjustment coefficient is inversely proportional to that of the first adjustment coefficient.

12. The method according to claim 10, further comprising:

setting, by the controller, an upper limit and a lower limit of the hibernation time; and modifying, according to the upper limit or the lower limit of the hibernation time, the adjusted hibernation time, so that a value of the adjusted hibernation time is between the upper limit and the lower limit of the hibernation time.

13. The method according to claim 1, further comprising:

sending, by the controller, a response message to a requesting party that sends an object IO request, wherein the response message carries a final processing result of the object IO request; and updating the to-be-processed quantity.

14. A service flow control method in an object-based storage system comprising a controller and a storage device client, the method comprising:

receiving, by the controller, a first object IO request;

acquiring, by the controller, a split size threshold, wherein the split size threshold is a size threshold of an object IO request to be processed by the object-based storage system;

when a size of the first object IO request is greater than the split size threshold, splitting, by the controller, the first object IO request into multiple sub-object IO requests, wherein a size of each sub-object IO request is not greater than the split size threshold and carries a same identifier;

sending a first sub-object IO request to the storage device client;

starting a hibernation time period;

receiving a response message replied by the storage device client for the first sub-object IO request, wherein the response message carries a processing result of the first sub-object IO request; and adjusting the hibernation time period according to a received processing result of an object IO request when a preset condition is met.

15. The method according to claim 14, wherein after the starting the hibernation time period, the method further comprises:

after the hibernation time period ends, sending a second sub-object IO request to the storage device client.

16. The method according to claim 14, further comprising:

after the receiving a first response message from the storage device client in response to the first sub-object IO request, updating a sent quantity, wherein the sent quantity is a quantity of object IO requests that are sent by the controller to the storage device client;

when the processing result of a first object IO request that is carried in the first response message indicates a processing success, updating a successfully processed quantity, wherein the successfully processed quantity is a quantity of received object IO requests that are successfully processed by the storage device client; and when the processing result of the first object IO request that is carried in the first response message indicates a final processing failure, retaining a successfully processed quantity unchanged.

17. The method according to claim 14, wherein the adjusting the hibernation time period comprises:

periodically acquiring, by the controller, a current value of the sent quantity and a current value of the successfully processed quantity according to a preset time period;

calculating a processing success rate of an object IO request according to the current value of the sent quantity and the current value of the successfully processed quantity; and adjusting a hibernation time by using the processing success rate as a first adjustment coefficient.

18. The method according to claim 17, further comprising:

adjusting the hibernation time obtained after adjustment is performed according to the first adjustment coefficient and a third adjustment coefficient, wherein a value of the third adjustment coefficient is inversely proportional to that of the first adjustment coefficient.

19. The method according to claim 17, further comprising:

setting, by the controller, an upper limit and a lower limit of the hibernation time; and modifying, according to the upper limit or the lower limit of the hibernation time, the adjusted hibernation time, so that a value of the adjusted hibernation time is between the upper limit and the lower limit of the hibernation time.

20. A device for implementing service flow control in an object-based storage system, comprising:

a controller, wherein the controller is configured to receive a first object IO request;

acquire a processing quantity threshold and a to-be-processed quantity wherein the processing quantity threshold is a threshold of a quantity of object IO requests to be processed by the object-based storage system, and the to-be-processed quantity is a quantity of to-be-processed object IO requests in the object-based storage system;

when the to-be-processed quantity is less than the processing quantity threshold, send the first object IO request to the storage device client and update the to-be-processed quantity;

receive a first response message from the storage device client in response to the first object IO request, wherein the first response message carries a processing result of the first object IO request; and adjust the processing quantity threshold according to a received processing result of an object IO request when a preset condition is met.

21. The device according to claim 20, wherein the controller is further configured to
update a sent quantity after receiving the first response message from the storage device client in response to the first object IO request, wherein the sent quantity is a quantity of object IO requests that are sent by the controller to the storage device client; and
when the processing result carried in the first response message indicates a processing success, update a successfully processed quantity, wherein the successfully processed quantity is a quantity of received object IO requests that are successfully processed by the storage device client.

22. The device according to claim 20 wherein the controller is further configured to
split the first object IO request into multiple sub-object IO requests when the first object IO request is greater than a split size threshold, wherein a size of each sub-object IO request is not greater than the split size threshold and carries a same identifier, and the split size threshold is a size threshold of an object IO request to be processed by the object-based storage system;
send one of the multiple sub-object IO requests to the storage device client; and
start a hibernation time period, and send a subsequent one of the multiple sub-object IO requests to the storage device client after the hibernation time period ends.

23. The device according to claim 22, wherein the controller is further configured to
receive a response message from the storage device client after each of the multiple sub-object IO requests was sent, wherein the response message carries a processing result of the each of the multiple sub-object IO requests; update a sent quantity, wherein the sent quantity is a quantity of object IO requests that are sent to the storage device client; and
when the processing result indicates a processing success, update a successfully processed quantity, wherein the successfully processed quantity is a quantity of received object IO requests that are successfully processed by the storage device client.

24. The device according to claim 21, wherein the controller is further configured to:
periodically acquire a current value of the sent quantity and a current value of the successfully processed quantity according to a preset time period; calculate a processing success rate of an object IO request according to the current value of the sent quantity and the current value of the successfully processed quantity; and adjust the processing quantity threshold by using the processing success rate as a first adjustment coefficient.

25. The device according to claim 24, wherein the controller is further configured to
adjust, according to a second adjustment coefficient, a processing quantity threshold that is obtained after the adjusting of the processing quantity threshold is performed according to the first adjustment coefficient, wherein a value of the second adjustment coefficient is proportional to that of the first adjustment coefficient.

26. The device according to claim 24, wherein the controller is further configured to
set an upper limit and a lower limit of the processing quantity threshold;
modify, according to the upper limit or the lower limit of the processing quantity threshold, the adjusted processing quantity threshold, so that a value of the adjusted processing quantity threshold is between the upper limit and the lower limit of the processing quantity threshold.

27. The device according to claim 21, wherein the controller is further configured to
periodically acquire a current value of the sent quantity and a current value of the successfully processed quantity according to a preset time period; calculate a processing success rate of an object IO request according to the current value of the sent quantity and the current value of the successfully processed quantity; and adjust a hibernation time by using the processing success rate as a first adjustment coefficient.

28. The device according to claim 27, wherein the controller is further configured to
adjust the hibernation time according to a third adjustment coefficient and the first adjustment coefficient, wherein a value of the third adjustment coefficient is inversely proportional to that of the first adjustment coefficient.

29. The device according to claim 28, wherein: the controller is further configured to
set an upper limit and a lower limit of the hibernation time; and
modify, according to the upper limit or the lower limit of the hibernation time, the adjusted hibernation time, so that a value of the adjusted hibernation time is between the upper limit and the lower limit of the hibernation time.

30. The device according to claim 20, wherein the controller is further configured to send a response message to a requesting party that sends an object IO request, wherein the response message carries a final processing result of the object IO request; and update the to-be-processed quantity.

* * * * *